United States Patent
Xie et al.

(10) Patent No.: US 9,401,868 B2
(45) Date of Patent: Jul. 26, 2016

(54) METHOD OF TRAFFIC ENGINEERING FOR PROVISIONING ROUTING AND STORAGE IN CONTENT-ORIENTED NETWORKS

(71) Applicant: Futurewei Technologies, Inc., Plano, TX (US)

(72) Inventors: Haiyong Xie, Union City, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/802,407

(22) Filed: Mar. 13, 2013

(65) Prior Publication Data

US 2014/0126370 A1     May 8, 2014

Related U.S. Application Data

(60) Provisional application No. 61/724,133, filed on Nov. 8, 2012.

(51) Int. Cl.
| | |
|---|---|
| H04L 12/26 | (2006.01) |
| H04L 12/803 | (2013.01) |
| H04L 12/721 | (2013.01) |
| H04L 12/729 | (2013.01) |
| H04L 12/709 | (2013.01) |

(52) U.S. Cl.
CPC ............ *H04L 47/125* (2013.01); *H04L 45/124* (2013.01); *H04L 45/125* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 2012/0136945 | A1 | 5/2012 | Lee et al. |
| 2012/0137336 | A1* | 5/2012 | Applegate .......... H04N 21/2225 725/95 |
| 2013/0041982 | A1 | 2/2013 | Shi et al. |
| 2013/0166695 | A1* | 6/2013 | Lee ................ 709/219 |
| 2013/0198351 | A1* | 8/2013 | Widjaja et al. ............... 709/223 |
| 2014/0032714 | A1* | 1/2014 | Liu et al. ................ 709/217 |

FOREIGN PATENT DOCUMENTS

| | | |
|---|---|---|
| CN | 102143199 A | 8/2011 |
| WO | 2012082920 A2 | 6/2012 |

OTHER PUBLICATIONS

AT&T Intellectual Property, "AT&T Content Acceleration Service—Delivering the Next Generation of Web Experience Improvement," Product Brief, Mar. 24, 2011, 2 pages.

Bienstock, "Potential Function Methods for Approximately Solving Linear Programming Problems: Theory and Practice," Kluwer Academic Publishers, Boston, Aug. 2002, 92 pages.

(Continued)

*Primary Examiner* — Jutai Kao
(74) *Attorney, Agent, or Firm* — Conley Rose, P.C.; Grant Rodolph; William H. Dietrich

(57) ABSTRACT

A transceiver configured to receive and transmit data in a content oriented network (CON), and a processor configured to obtain a jointly provisioned routing and storage solution resolved according to an aggregated data flow equation generating a conventional data flow of content on a link to a destination, and an aggregated data flow of the content on the link, and a storage indicator, and to determine whether to store and transmit the data.

20 Claims, 14 Drawing Sheets

(56) References Cited

OTHER PUBLICATIONS

Borst, et al., "Distributed Caching Algorithms for Content Distribution Networks," Proceedings of the 29th Conference on Information Communications (INFOCOM'10), IEEE Press, Piscataway, New Jersey, USA, 9 pages.
Breslau, et al., "Web Caching and Zipf-like Distributions: Evidence and Implications," Proc. IEEE INFOCOM, Mar. 1999, 9 pages.
Carofiglio, et al., "Modeling Data Transfer in Content-Centric Networking," Proceedings of the 23rd International Teletraffic Congress, 2011, 7 pages.
Cheng, et al., "Statistics and Social Network of YouTube Videos," 16th International Workshop on Quality of Service, Jun. 2008, 9 pages.
Chow, et al., "Distributed Group-based Cooperative Caching in a Mobile Broadcast Environment," Proceedings of the 6th International Conference on Mobile Data Management, Ayia Napa, Cyprus, May 2005, 9 pages.
Cisco Public Information, "Hyperconnectivity and the Approaching Zettabyte Era," Cisco Visual Networking Index, Jun. 2010, 14 pages.
Dilley, et al., "Globally Distributed Content Delivery," IEEE Internet Computing vol. 6—Issue 5, Sep. 2002, 8 pages.
DiPalantino, et al., "Traffic Engineering vs. Content Distribution: A Game Theoretic Perspective," 28th IEEE International Conference on Computer Communications, Rio de Janeiro, Brazil, Apr. 2009, 8 pages.
Dykes, et al., "A Viability Analysis of Cooperative Proxy Caching," Proceedings of the INFOCOM Conference, Apr. 2001, 9 pages.
Erman, et al., "To Cache or Not to Cache: The 3G Case," IEEE Internet Computing vol. 15—Issue 2, Mar. 2011, 7 pages.
Fan, et al., "Summary Cache: A Scalable Wide-Area Web Cache Sharing Protocol," IEEE/ACM Transactions on Networking vol. 8—Issue 3, Jun. 2000, 12 pages.
Fortz, et al., "Internet Traffic Engineering by Optimizing OSPF Weights," Proceedings of the 19th Annual Joint Conference of the IEEE Computer and Communications Societies, Tel Aviv, Israel, Mar. 2000, 9 pages.
Gadde, et al., "Web Caching and Content Distribution: A View From the Interior," Journal of Computer Communications vol. 24—Issue 2, Feb. 2001, 9 pages.
Gill, et al., "YouTube Traffic Characterization: A View From the Edge," Proceedings of the 7th ACM SIGCOMM conference on Internet Measurement, San Diego, California, Oct. 2007, 13 pages.
Grigoriadis, et al., "Fast Approximation Schemes for Convex Programs With Many Blocks and Coupling Constraints," DIMACS Technical Report 91-24, Mar. 1991, 31 pages.
Hefeeda, et al., "On the Benefits of Cooperative Proxy Caching for Peer-to-Peer Traffic," IEEE Transactions on Parallel and Distributed Systems vol. 21—Issue 7, Jul. 2010, 12 pages.
Jacobson, et al., "Networking Named Content," Proceedings of the 5th International Conference on Emerging Networking Experiments and Technologies, ACM, Rome, Italy, Dec. 2009,12 pages.
Jiang, et al., "Cooperative Content Distribution and Traffic Engineering in and ISP Network," Proceedings of the 11th International Joint Conference on Measurement and Modeling of Computer Systems, ACM, Seattle, Washington, Jun. 2009, 11 pages.
Korupolu, et al., "Coordinated Placement and Replacement for Large-Scale Distributed Caches," IEEE Transactions on Knowledge and Data Engineering vol. 14—Issue 6, Jul. 1999, 12 pages.
Liu, et al., "On the Interaction Between Overlay Routing and Traffic Engineering," Proceedings of IEEE INFOCOM, 2005, 13 pages.
Ni, et al., "Large-Scale Cooperative Caching and Application-Level Multicast in Multimedia Content Delivery Networks," IEEE Communications Magazine vol. 43—Issue 5, May 2005, 7 pages.
Buyya, et al., "Lecture Notes in Electrical Engineering—Content Delivery Networks," Springer-Verlag Berlin Heidelberg, 2008, 429 pages.
Plotkin, et al., "Fast Approximation Algorithms for Fractional Packing and Covering Problems," Report No. STAN-CS-92-1419, Feb. 1992, 44 pages.
Psaras, et al., "Modeling and Evaluation of CCN-caching Trees," Proceedings of the 10th International IFIP TC 6 Conference on Networking—vol. Part I, Valencia, Spain, May 2011, 13 pages.
Qiu, et al., "On Selfish Routing in Internet-Like Environments," Proceedings of the 2003 Conference on Applications, Technologies, Architectures, and Protocols for Computer Communications, ACM, Karlsruhe, Germany, Aug. 2003, 11 pages.
Sailhan, et al., "Cooperative Caching in Ad Hoc Networks," Proceedings of the 4th International Conference on Mobile Data Management, Melbourne, Australia, Jan. 2003, 16 pages.
Sarkar, et al., "Hint-based Cooperative Caching," Feb. 22, 1998, 32 pages.
Sourlas, et al., "On-Line Storage Management with Distributed Decision Making for Content-Centric Networks," 7th Euro-NGI Conference on Next Generation Internet, Kaiserslautern, Germany, Jun. 2011, 8 pages.
Wessels, et al., "Internet Cache Protocol (ICP), Version 2," Memo from the National Laboratory of Applied Network Research, Sep. 1997, 10 pages.
Wolman, et al., "On the Scale and Performance of Cooperative Web Proxy Caching," Proceedings of the 17th ACM Symposium on Operating Systems Principles, Charleston, South Carolina, Dec. 1999, 15 pages.
Xie, et al., "TECC: Towards Collaborative In-network Caching Guided by Traffic Engineering," Proceedings of the IEEE INFOCOM, Mar. 2012, 4 pages.
Xie, et al., "P4P: Provider Portal for Applications," SIGCOMM Computer Communications Review vol. 38—Issue 4, Aug. 2008, 11 pages.
Yin, et al., "Supporting Cooperative Caching in Ad Hoc Networks," IEEE Transactions on Mobile Computing, Jan. 2006, 12 pages.
Zhang, et al., "Named Data Networking (NDN) Project," Technical Report NDN-0001, Oct. 2010, 26 pages.
Held, et al., "Validation of Subgradient Optimization," Mathematical Programming vol. 6—Issue 1, 1974, 26 pages.
Foreign Communication From a Counterpart Application, PCT Application No. PCT/CN2013/086805, International Search Report dated Feb. 20, 2014, 6 pages.
Foreign Communication From a Counterpart Application, PCT Application No. PCT/CN2013/086805, Written Opinion dated Feb. 20, 2014, 4 pages.

\* cited by examiner

METHOD OF TRAFFIC ENGINEERING FOR PROVISIONING ROUTING AND STORAGE IN CONTENT-ORIENTED NETWORKS

CROSS-REFERENCE TO RELATED APPLICATIONS

This application claims priority to U.S. Provisional Application No. 61/724,133, filed Nov. 8, 2012 by Haiyong Xie, et al., titled "Method of Traffic Engineering for Provisioning Routing and Storage in Content-Oriented Networks," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture in which the focus is on locating and providing information to users rather than on connecting end hosts that exchange data. One type of ICN is a Content-Oriented Network (CON). In a CON, also referred to as a Content Centric Network (CCN), a content router is responsible for routing user requests and content to proper recipients. The entities may comprise data content, such as video clips or web pages, and/or infrastructure elements, such as routers, switches, or servers.

Content Delivery Networks (CDNs) have previously been adopted to achieve content delivery. CDNs are typically deployed and operated either (a) independently by third-party CDN carriers as inter-domain overlays spanning across multiple underlying networks operated by multiple Internet Service Providers (ISPs); or (b) by an individual ISP within the ISP's networks in order to achieve intra-domain content dissemination. In the third-party CDN case, these two capabilities may be provisioned by ISPs in an underlay and CDN carrier in an overlay; in ISP-owned CDNs, in-network storage may be managed as an overlay service for the convenience of operations and management.

CONs may differ from CDNs in that the former require that routing and in-network storage capabilities be provisioned jointly and consistently, while the latter may provision them separately and inconsistently. The separation of routing and in-network storage capabilities may lead to potential conflicts. For example, when content storage operates as an overlay service, overlay may cancel off the Traffic Engineering (TE) efforts in the underlay or vice versa. Furthermore, the operational objectives of routing and storage may differ, and recent studies on Internet Protocol (IP) networks indicate that the conflicts may result in significant efficiency loss.

Many ISPs have adopted TE to provision network capabilities. However, TE faces new challenges in CONs, e.g., the conventional flow conservation laws, which are fundamental to all TE algorithms and systems, may no longer hold. This may raise at least three distinct challenges. The first challenge raised is provisioning both routing and storage capabilities simultaneously and consistently. In CONs, each ISP may own and may manage both routing and storage capabilities in its intra-domain network. Existing studies for IP networks suggest that conflicts and efficiency losses could occur if they are provisioned separately. Hence, it may be desirable to align the objectives of provisioning routing and provisioning storage capabilities in CONs and coordinate their practice in order to contain potential conflicts, prevent efficiency losses, and maximize the benefits of CONs. The second challenge arises from the disappearance of the conventional flow conservation laws due to the introduction of CON router storage capabilities. More specifically, the total traffic of outgoing flows of a router may be larger than that of incoming flows, since CONS allow routers to store incoming flows for immediate and later use. As a result, traditional TE algorithms, which all rely on the conventional flow conservation law, may no longer be suitable for CONs. The third challenge that may arise is the relative unpopularity of a dominant portion of the content. A need arises to formulate TE for CONs to optimally provision the CON routers' routing and storage capabilities and help reduce or eliminate such instances.

SUMMARY

In one embodiment, the disclosure includes a transceiver configured to receive and transmit data in a CON, and a processor configured to obtain a jointly provisioned routing and storage solution resolved according to an aggregated data flow equation generating a conventional data flow of content on a link to a destination, and an aggregated data flow of the content on the link, and a storage indicator, and to determine whether to store and transmit the data.

In another embodiment, the disclosure includes a method for traffic engineering executable by a processor in a network node, comprising receiving content at a network node in a CON, wherein the network node has a routing capability and a storage capability, deciding whether to store the content at the node, wherein the decision is based on selection criteria identified by a process comprising decoupling routing provisioning from coordinated storage provisioning jointly provisioning the routing capability and the storage capability of the network node, wherein the provisioning complies with a set of flow conservation laws and at least one content storage constraint, and wherein the routing provisioning is decoupled from the coordinated storage provisioning of the routers.

In another embodiment, the disclosure includes a computer program product comprising computer executable instructions stored on a non-transitory medium that when executed by a processor cause the processor to perform the following: utilize a set of aggregated flow conservation rules, determine a storage capacity limit, select a TE objective comprising a linear function of $x_l^{t,c}$, $y_l^c$, $z_k^c$, determine $x_l^{t,c}$, $y_l^c$, $z_k^c$, and B that comply with the set of aggregated flow conservation rules, the storage capacity, and the objective, wherein $x_l^{t,c}$ is the conventional data flow of content c on link l to destination t, wherein $y_l^c$ is the aggregated data flow of content c on link l, wherein $z_k^c=1$ means that node k stores content c and $z_k^c=0$ otherwise, and wherein B is an upper bound of total outgoing flow, determine a joint provisioning routing and storage solution, and store content c on a network node and transmit traffic from the network node based on the jointly provisioned routing and storage solution.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for implementing TE for provisioning, routing, and storage in ICNs/CONs. While the disclosed methods, systems, and apparatuses may be described primarily with reference to CONs and ICNs, they may be applied to any network which shares the following characteristics: (1) routing/forwarding and in-network storage are deployed (and may be managed) in the same network layer; or (2) routing/forwarding and in-network storage are deployed in different network layers, but managed jointly.

This disclosure includes explaining a joint or multi-variable optimization problem for intra-domain CON TE. To address this problem, this disclosure includes new flow conservation laws, including both routing and storage constraints for CONs. According to the disclosed techniques, deactivating the storage constraints may cause the formulation to degenerate into traditional TE in IP networks. This disclosure includes decoupling routing provisioning (RP) from coordinated storage provisioning (CSP) to achieve applicability to CSP activated and CSP deactivated CONs. By doing so, a set of weights may be derived, which may enable not only decoupling of the RP from the CSP, but may also guide CSP based on RP decisions. The potential performance gain of the disclosed approach as compared to CDN-based and CCN-based approaches may be as high as 80% or higher on multiple network topologies for multiple metrics. Consequently, the proposed TE algorithm may improve network utilization, cut the cost for the content providers, and reduce the average load on the servers, particularly for smaller cache sizes.

Figure 1C:
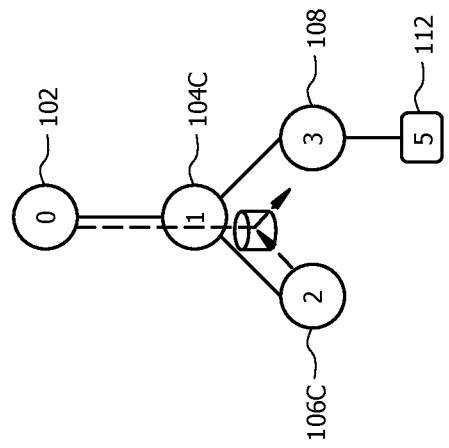
FIG. 1C is a schematic diagram illustrating flow conservation for a fractional value of $z_k^c$.
Figure 1B:
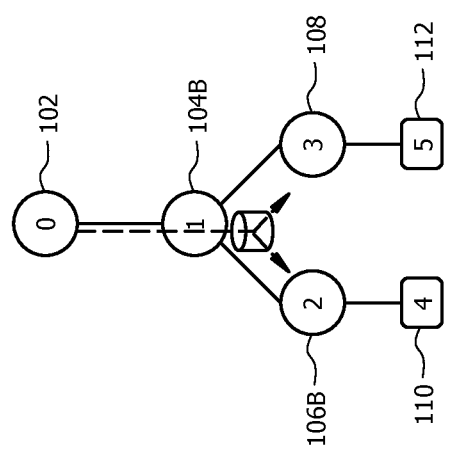
FIG. 1B is a schematic diagram illustrating a new flow conservation for nodes having storage capabilities.
Figure 1A:
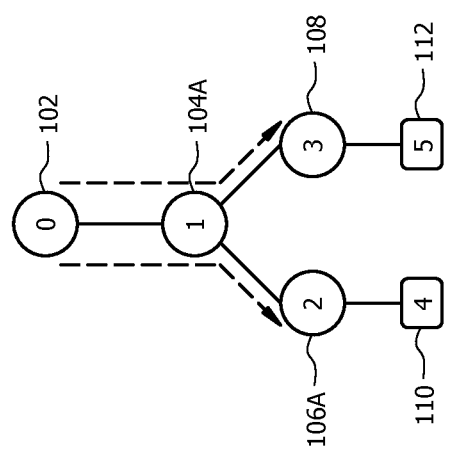
FIG. 1A is a schematic diagram illustrating a conventional flow conservation for content requested by downstream client nodes.

FIGS. 1A, 1B, and 1C show instances of flow conservation for various cases described herein. FIG. 1A shows a conventional flow, while FIGS. 1B and 1C show flows in networks having routers configured to store content. FIGS. 1A, 1B, and 1C contain nodes 102-112. Node 102, labeled '0', may be any device suitably configured to store and route content, e.g., a server, etc. Nodes 104-112, labeled '1'-'5' as appropriate, may be any devices suitably configured to route content, e.g., routers, servers, switches, etc., and may be connected as shown. Nodes 104B, 104C, and 106C may be any devices suitably configured to both store content and route content. FIGS. 1A, 1B, and 1C may contain one or both downstream nodes 110 and 112. The downstream nodes 110 and 112 may be the same as any of the nodes 102-108, or may be endpoints, e.g., destination computers, televisions, mobile phones, etc. Downstream nodes, e.g., 106-112, may request content from upstream nodes, e.g., nodes 102-108, as appropriate.

FIG. 1A is a schematic diagram illustrating a conventional flow conservation for content requested by downstream client nodes 110 and 112. As described above, nodes 102-108 may not have content storage capabilities and may only be configured to route traffic. In FIG. 1A, content requested by downstream nodes 110 and 112 may travel from the content origination node 102 through node 104A and to downstream nodes 110 and 112 through routers 106A and 108, respectively. In FIG. 1A, two separate data flows are depicted, 0→1→2→4 and 0→1→3→5. In other words, the entirety of the requested content in each flow originates from the content origination node 102 and passes separately or concurrently to the downstream requesting client nodes 110 and 112.

In a network managed by a single administrative domain, e.g., the network of FIG. 1A, content objects may be segmented into fixed-length pieces with each piece uniquely named, and each uniquely named piece may be treated as a unique object. Further, for a given content there may be multiple origins, e.g., nodes 102 and 106C in FIG. 1C. However, by introducing a virtual node connecting the multiple origins, the multi-origin problem may be transformed into a single-origin problem and evaluated in a conventional manner. Thus, without loss of generality, it may be assumed that there exists only one origin for each content, yielding the following conventional flow conservation notion:

$$\left. \begin{array}{l} \sum_{l \in out(k)} x_l^{t,c} - \sum_{l \in in(k)} x_l^{t,c} = 0, \forall k, k \notin \{t, o(c)\}, \forall c, \\ \sum_{l \in out(k)} x_l^{t,c} - \sum_{l \in in(k)} x_l^{t,c} = d_k^c, k = o(c), \forall c, \\ \sum_{l \in out(k)} x_l^{t,c} - \sum_{l \in in(k)} x_l^{t,c} = -d_k^c, \forall k = t, \forall c. \end{array} \right\} \quad (A1)$$

| Notation | Meaning |
|---|---|
| l | A link |
| t | A destination |
| c | A content |
| k | A node |
| V | The set of all nodes |
| E | The set of all links |
| $w_l$ | The cost of link l |
| $C_l$ | The capacity of link l |
| $S_k$ | The storage capacity of node k |
| $s^c$ | The size of content c |
| B | A sufficiently large number constant |
| o(c) | The origin node for content c |
| $d_k^c$ | The total number of downstream demands for content c attached to node k |
| $x_l^{t,c}$ | The "conventional" data flow of content c on link l to the destination t |
| $y_l^c$ | The "aggregated" data flow of content c on link l |
| $Z_k^c$ | $Z_k^c = 1$ means node k stores content c; 0 otherwise |

FIG. 1B is a schematic diagram illustrating a new flow conservation for nodes having storage capabilities. In FIG. 1B, node 104B is configured to store the requested content locally and send the requested content to downstream nodes 110 and 112 via nodes. For example, downstream nodes 110 and 112 may request content from the originating node 102. Content from originating node 102 may be merged at node 104B, thereby leveraging node 104B's storage capability. After merging, such data flows may be referred to as "aggregated" data flows. As described, $y_l^c \geq x_l^{t,c}$, $\forall t,c$. Also, on link $0 \rightarrow 1$, the data flow $y_{0 \rightarrow 1}^c$ may equal two for 104A, e.g., $z_1^c = 0$, and the data flow $y_{0 \rightarrow 1}^c$ may equal one for 104B, e.g., $z_k^c = 1$. Thus, when $z_k^c = 1$, the outgoing flow may be greater than the incoming flow. Conversely, when $z_k^c = 0$, the outgoing flow must be equal to the incoming flow. In other words, because of the addition of storage capability, at 104B the total outgoing flow may be two complete sets of content data while the incoming flow may only be one complete set of content data, a condition that violates the conventional flow conservation law.

FIG. 1B suggests the need for a new flow conservation law to allow proper TE formulations. Devising a new flow conservation law may begin by formulating a new flow conservation constraint. An example formulation of a new flow conservation constraint is disclosed herein in the following form:

$$d_k^c + \Sigma_{l \in out(k)} y_l^c - \Sigma_{l \in in(k)} y_l^c \leq B z_k^c, \forall k \in V, \forall c. \quad (B1.1)$$

More specifically, for node k, the total outgoing flow $d_k^c + \Sigma_{l \in out(k)} y_l^c$ may be the sum of demands of the clients attached directly to node k as well as the flow it forwards to other nodes. The parameter B may be a sufficiently large number constant and may be treated as an upper bound for the total outgoing flow. In practice, B may be set to the total capacity over all outgoing links of node k. As stated, with conventional flows, when $z_k^c = 0$, the outgoing flow may not exceed the incoming flow at node k. When $z_k^c = 1$, flow $x_l^{t,c}$ over the incoming link l of node k may be merged into $y_l^c$, so $y_l^c = \max_t \{x_l^{t,c}\}$. Notably, when $z_k^c = 0$, the aggregated data flow $y_l^c$ may be the sum of all flows heading to all destinations, e.g., $y_l^c = \Sigma_t x_l^{t,c}$, $\Sigma_t x_l^{t,c}$, $\forall l \in in(k)$, $\forall c$, since, for some destination t, it is possible that $x_l^{t,c} = 0$, and consequently the value of $y_l^c$ may lay in the range $[\max_t \{x_l^{t,c}\}]$.

In addition, when node k has storage capability, e.g., node 104B, and $z_k^c = 1$, the total demand by node k may be reduced to one for any downstream demand $d_k^c \geq 1$, as it may only need to receive 1 unit of flow from the origin or other nodes, irrespective of how many demands arrive from clients served by node k. The reduced demand at node k, denoted as $\hat{d}_k^c$, may therefore be required to satisfy (i), if $z_k^c = 0$, and (ii) $\hat{d}_k^c = 1$, if $z_k^c = 1$. In the latter case, the demand $\hat{d}_k^c = 1$ at node k may be necessary and sufficient when the decision to store content, e.g., $z_k^c = 1$, is made. Combining these requirements into a single formulation with respect to the decision variable $z_k^c \in \{0,1\}$ may yield $\hat{d}_k^c = d_k^c \cdot (1 - z_k^c) + z_k^c$, $z_k^c \in \{0,1\}$. Thus, the new aggregated flow conservation law may be formulated in the following form:

$$\left. \begin{array}{l} \sum_{l \in out(k)} x_l^{t,c} - \sum_{l \in in(k)} x_l^{t,c} = 0, \forall k, k \notin \{t, o(c)\}, \forall c, \\ \sum_{l \in out(k)} x_l^{t,c} - \sum_{l \in in(k)} x_l^{t,c} = \hat{d}_k^c, k = o(c), \forall c, \\ \sum_{l \in out(k)} x_l^{t,c} - \sum_{l \in in(k)} x_l^{t,c} = -\hat{d}_k^c, \forall k = t, \forall c. \end{array} \right\} \quad (B1.2)$$

It is worth noting that the new aggregated flow conservation constraint (B1.1) and the new aggregated flow conservation law (B1.2) should be used together to ensure feasible flows. Removing constraint (B1.1) may result in an infeasible solution $x_l^t$ satisfying the new aggregated flow conservation constraint (B1.1), provided that $y_l \geq x_l^t$. FIG. 1C shows such an example. Note that, for ease of understanding, $z_k^c \in \{0,1\}$ may be assumed in the above formulation. However, in practice, a fractional value of $z_k^c$ may be more likely.

FIG. 1C is a schematic diagram illustrating flow conservation for a fractional value of $z_k^c$. In FIG. 1C, nodes 104C and 106C may be configured to store content, node 108 may have a demand $d_k^c = 1$, and node 102 may be the only node connected to the origin. In FIG. 1C, there may be a cost of fetching an object c from the originating node 102, e.g., 100, and a cost of data flow $1 \rightarrow 2$, e.g., 1. However, at node 108, what is received may be 0.5 units from originating node 102 and 0.5 units of duplicated flow stored at node 104C, which may result in the loop $1 \rightarrow 2 \rightarrow 1 \rightarrow 3$ and back to node 3 at a later point. In this case, flow conservation constraint (B1.1) may be satisfied with $y_{0 \rightarrow 1} = y_{1 \rightarrow 2} = y_{2 \rightarrow 1} = 0.5$ and $y_{1 \rightarrow 3} = 1$. However, with aggregated data flow $y_l$, there may not be a solution of $x_l^t$ which satisfies constraint (B1.2) and $y_l \geq x_l^t$.

To further illustrate the concept, in another instance FIG. 1C may have a different fractional value of $z_k^c = 0.8$, which may mean that 80% of the flow for content c seen by node k, e.g., node 104C, is stored locally and the remaining 20% needs to be fetched from somewhere else, e.g., node 106C, wherein 20% of demand is indicated in the first part, $d_k^c(1 - z_k^c)$. In some embodiments, this may also be treated as the probability of storing the data locally. Consequently, the expectation of the total demand at node k may be $\hat{d}_k^c = d_k^c(1-z_k^c) + z_k^c$, $0 \le z_k^c \le 1$.

With the aggregated flow conservation law (B1.2), a TE for CONs may be formulated. Assuming a general objective function $F(y_l^c)$, and a multiple variable optimization problem of jointly provisioning routing and storage capabilities may be formulated as follows, which may separately be referred to herein as indicated:

$$\min \Sigma_c \Sigma_l F(y_l^c) \quad (B1.3)$$

$$s.t. \text{ constraints} \quad (B1.1), (B1.2)$$

$$\Sigma_c y_l^c \le C_l, \forall l \in E \quad (B1.4)$$

$$\Sigma_c z_k^c \le S_k, \forall k \in V \quad (B1.5)$$

Constraint (B1.4) may indicate the bandwidth limit for each link. Constraint (B1.5) may indicate the storage capacity limit at each node. The constraints may jointly ensure that over each link, the conventional flow to all destinations should be bounded by the aggregated flow, e.g., as indicated in (B1.6). Notably, the TE objective may be a linear function of flows and/or any linear function of $x_l^{t,c}$, $y_l^c$, $z_k^c$. For example, when each link l has a distance metric, denoted by $w_l$, the bandwidth-distance product, $F(y_l^c) = w_l y_l^c$, may be the TE objective.

MLU may be another commonly used TE objective, and may be formulated as follows:

$$\min \max_l \sum_c y_l^c / C_l$$

s.t. constraints (B1.1), (B1.2), (B1.5), (B1.6), and (B1.7). By introducing a new variable, $\mu = \max_l \Sigma_c y_l^c / C_l$, the above formulation may be rewritten into a linear program as follows:

$$\min \mu \sum_c y_l^c \le \mu$$

s.t. constraints (B1.1), (B1.2), (B1.5), (B1.6), and (B1.7).

Bit Cost Product (BCP), as a special case of the general objective function $F(y_l^c)$, may be another commonly used TE objective, and may be formulated as follows:

$$\min \sum_c D_l y_l^c$$

s.t. constraints (B1.1), (B1.2), (B1.5), (B1.6), and (B1.7), where $D_l$ is the cost of transmitting one bit on link l. Here, the cost may be measured by the physical distance of a link or by some conceptual virtual distance.

Bit Hop-count Product (BHP), as another special case of the general objective function $F(y_l^c)$, may be another commonly used TE objective, and may be formulated as follows:

$$\min \sum_c H_l y_l^c$$

s.t. constraints (B1.1), (B1.2), (B1.5), (B1.6), and (B1.7), where $H_l$ is the hop count on link l. Here, the hop count captures the number of network devices that may be traversed when transmitting bits on the wire. The hop count on a link may be '1' if the link does not have intermediate routers or switches, or may be some number greater than '1' if otherwise.

A decentralized, iterative algorithm may be designed via decomposition to solve the optimization problem of jointly provisioning routing and storage capabilities. Note that in the Linear Programming (LP) described in (B1.3)-(B1.7), the variables $y_l^c$ and $z_k^c$ may be coupled due to the constraints (B1.4) and (B1.5). Solving such an optimization problem may be very challenging for extremely large number of contents, even with a state-of-the-art commercial LP solver. To overcome this challenge, Lagrangian Relaxation (LR) may be used on the constraints (B1.4) and (B1.5). These constraints may be merged into the objective function with Lagrangian multipliers $\alpha_l \ge 0$ and $\beta_k \ge 0$, respectively. The multi-variable optimization problem of jointly provisioning routing and storage capabilities may then be decomposed into many subproblems, one for each content, as shown below and referred to herein as indicated:

$$\min \Sigma_l(w_l + \alpha_l) \cdot y_l^c + \Sigma_k \beta_k \cdot z_k^c - \Sigma_l \alpha_l \cdot C_l - \Sigma_k \beta_k \cdot S_k \quad (C1.1)$$

$$s.t. \ y_l^c \ge x_l^{t,c}, \forall l \forall t \in V, \forall c \quad (C1.2)$$

$$z_k^c \in \{0,1\}, y_l^c \ge 0, x_l^{t,c} \ge 0 \quad (C1.3)$$

Constraints (B1.1) and (B1.2).

The Lagrangian multipliers $\alpha_l \ge 0$ and $\beta_k \ge 0$ may be treated as the penalty of violating the corresponding constraints. Note that in the objective function (C1.1), the term $(-\Sigma_l \alpha_l C_l - \Sigma_k \beta_k S_k)$ does not affect the optimal solution. Let $L^c(\alpha_l, \beta_k)$ be the optimal value of (C1.1) for each content c and for given Lagrangian multipliers, then next the values of $\alpha_l, \beta_k$ may need to be found to maximize the function $L(\alpha_l, \beta_k) = \Sigma_c L^c(\alpha_l, \beta_k)$. Note that the gradient of Lagrangian function with respect to $\alpha_l$ and $\beta_k$ may be expressed as follows:

$$\frac{\partial L}{\partial \alpha_l} = \sum_c y_l^c - C_l, \quad \frac{\partial L}{\partial \beta_k} = \sum_c z_k^c - S_k \quad (C1.4)$$

Variables $\alpha_l$ and $\beta_k$ may be updated toward the maximization of $\Sigma_c L^c(\alpha_l, \beta_k)$ by the following iterative processing, referred to herein as indicated, wherein during each iteration $\tau+1$:

$$\alpha_l(\tau+1) = \max\{0, \alpha_l(\tau) + \theta_1(\tau)(\Sigma_c y_l^c - C_l)\} \quad (C1.5)$$

$$\beta_k(\tau+1) = \max\{0, \beta_k(\tau) + \theta_2(\tau)(\Sigma_c z_k^c - S_k)\} \quad (C1.6)$$

An optimal solution may be found by iteratively updating the variables $\alpha_l, \beta_k$ and the solution from LP sub-problem in (C1.1)-(C1.3), provided that a suitable step size of $\theta_1(\tau), \theta_2(\tau)$ is selected. The basic algorithm may be expressed as follows:

1. Initialize the Lagrangian multipliers $\alpha_l, \beta_k$ with 0.
2. Repeat until stopping criterion or maximal number of iterations has been reached:
3.     For each content, do:
4.         Solve (C1.1), (C1.2), and (C1.3);
5.         Update $\alpha_l$ and $\beta_k$ with (C1.5) and (C1.6);
6. Return the solution $x_l^{t,c}, y_l^c,$ and $z_k^c$ A step size rule shown in the art to have a good performance may be expressed as follows:

$$\theta_i(\tau) = \lambda \cdot \frac{\left(u - \sum_c L^c(\alpha_l(\tau), \beta_k(\tau))\right)}{\|\delta_i(\tau)\|^2}, \quad i = 1, 2 \quad \text{(C1.7)}$$

In this approach, the step size may be adjusted during each iteration based on the current information of the solution. Here, u may denote the best upper bound for the original optimization problem of jointly provisioning routing and storage capabilities, e.g., as expressed in (B1.3), (B1.4), (B1.5), (B1.6), and (B1.7), at the current iteration (e.g., the minimal upper bound over all the previous iterations). Additionally, $\delta_i$ may be a sub-gradient with respect to the Lagrangian multipliers $\alpha_l$ and $\beta_k$, whose components at iteration $\tau$ are given by $\delta_1{}^l(\tau) = \Sigma_c y_l{}^c - C_l$ and $\delta_2{}^k(\tau) = \Sigma_c z_k{}^c - S_k$. Further, $\lambda$, may be a convergence control parameter given as $0 \leq \lambda \leq 2$. The details of the convergence results of the algorithm are well known in the art. It may be apparent that $L^c(\alpha_l(\tau), \beta_k(\tau))$ is a lower bound of the optimal value, so the best lower bound, denoted as v, which may be solved by the formulation given in (C1.1), (C1.2), and (C1.3), may be kept over each content. An upper bound of the optimal value, denoted by u, may need to be identified until the relative gap $$\frac{u - v}{u}$$

is sufficiently small. In such cases, the current upper bound may be considered suitably close to the optimal value. It may be difficult to ascertain how far away of the current upper bound to the optimal value from the gap given by $$\frac{u - v}{u}$$

in cases where the algorithm does not converge after certain iterations.

Note that at each iteration, the solution that comes from the sub-problem(s) in (C1.1), (C1.2), and (C1.3) by linear programming may be feasible with respect to the constraints (B1.1), (B1.2) and (B1.6), but it may not be feasible with respect to the constraints (B1.4) and (B1.5). Therefore, the current lower bound solution at current iteration may need to be adjusted to a new feasible solution to satisfy the constraint (B1.4) and (B1.5). Once complete, the adjusted solution may be used as an upper bound solution, the step size used in (C1.5) and (C1.6) may be calculated. The iterative procedure may be repeated until the gap $$\frac{u - v}{u}$$

is sufficiently small or the maximal number of iterations has been reached.

To find an adjusted feasible solution and identify an upper bound, an exponential potential function approach shown to comprise fast approximation algorithms for solving large-scale linear programs may be adopted. Other heuristic algorithms to update the caching variables such that the constraint (B1.5) is satisfied may also be considered. In the current approach, however, the potential functions $\Phi(y,z)$ associated to the constraints (B1.4) and (B1.5), respectively:

$$\Phi(y, z) = \sum_l e^{a*\left(\frac{\sum_c y_l^c}{C_l} - 1\right)} + \sum_k e^{a*\left(\frac{\sum_c z_k^c}{S_k} - 1\right)} \quad \text{(C1.8)}$$

One reason for using the potential function may be that when the variables $y_l{}^c$ and $z_k{}^c$ violate the corresponding constraints, the potential function will take high values, provided that the parameter a is set to an appropriate, sufficiently large number. Methods of selecting the convergence parameter a are well known in the art. To obtain a feasible solution, the potential function may need to be reduced if the current solution violates any of the constraints. Provided that the problem is feasible, a feasible solution may eventually be found over the constraint (B1.1), (B1.2) and (B1.6) by iteratively reducing the potential functions $\Phi(y, z)$, which is a convex function with respect to $y_l{}^c$ and $z_k{}^c$.

A steepest descent method may be adopted to reduce the potential function $\Phi$ and obtain an adjusted feasible solution $\Sigma_c \hat{y}_l{}^c(\tau)$ and $\hat{z}_k{}^c(\tau)$ by plugging the solution into the objective function found in (C1.1), (C1.2), and (C1.3). If the current solution is $\hat{y}_k{}^c(i)$ and $\hat{z}_k{}^c(i)$ at iteration limit i, a steepest descent direction at the current solution may need to be found. The direction derivative may then be given as:

$$\frac{\partial \Phi}{\partial y_l^c} = \frac{a}{C_l} \cdot e^{a*\left(\frac{\sum_c y_l^c(i)}{C_l} - 1\right)}$$

$$\frac{\partial \Phi}{\partial z_k^c} = \frac{a}{S_k} \cdot e^{a*\left(\frac{\sum_c z_k^c(i)}{S_k} - 1\right)}$$

Next, a direction may be found which minimizes the linear objective $[\nabla\Phi]^T q$, where q is a vector variable. Specifically, the problem may be expressed as follows:

$$\min \sum_l \frac{a}{C_l} \cdot e^{a*\left(\frac{\sum_c y_l^c(i)}{C_l} - 1\right)} \cdot q_l + \sum_k \frac{a}{S_k} \cdot e^{a*\left(\frac{\sum_c z_k^c(i)}{S_k} - 1\right)} \cdot q_k \quad \text{(C1.9)}$$

s.t. constraints (B1.1), (B1.2), (B1.6), (B1.7).

If $\hat{y}_l{}^c(i)$ and $\hat{z}_k{}^c(i)$ are the optimal solution to the above problem, then the next step may be to find an optimal step size it such that the value $\hat{y}_l{}^c(i+1)$ and $\hat{z}_k{}^c(i+1)$ minimize the potential function $\Phi(y_l, z_k)$ in the interval $\pi \epsilon [0,1]$, expressed as follows and referred to herein as indicated:

$$y_l^c(i+1) = \pi \cdot \hat{y}_l^c(i) + (1-\pi) \cdot y_l^c(i) \quad \text{(C1.10)}$$

$$z_k^c(i+1) = \pi \cdot \hat{z}_k^c(i) + (1-\pi) \cdot z_k^c(i) \quad \text{(C1.11)}$$

It is well known that the sequence $y_l{}^c(i+1)$ and $z_k{}^c(i+1)$ will converge to a $\epsilon$-feasible solution in a polynomial number of steps unless the original problem is infeasible. An $\epsilon$-feasible solution means that, instead of the original constraints $C_l$ and $S_k$, the $\epsilon$-feasible solution is guaranteed to satisfy the relaxed constraints with $(1+\epsilon)C_l$ and $(1+\epsilon)S_k$ where $\epsilon$ is an arbitrary small positive number. Therefore, a suitable approximation of the upper bound, denoted by $\hat{L}^c(\alpha_l(\tau), \beta_k(\tau))$, may be obtained. Many iterations may be required to converge a suitable upper bound using the steepest descent method in the potential function, which may render the above approach less desirable. One alternative approach that satisfies the storage constraint (B1.5) based on the current solution of data flows may be a heuristic approach.

Note that constraint (B1.1) may be rewritten as $\Sigma_{l\in in(k)} y_l^c \geq d_k^c + \Sigma_{l\in out(k)} y_l^c - B \cdot z_k^c, \forall k \in V, \forall c$. For a given $d_k^c + \Sigma_{l\in out(k)} y_l^c$, the minimal value of $\Sigma_{l\in out(k)} y_l^c$ may occur when $z_k^c = 1$. If $z_k^c = 1$, then the redundant incoming traffic toward node k for content c may be eliminated. This may suggest that when the storage of the node k is full, it may be preferable to keep the content which has a higher value in terms of $\Sigma_{l\in out(k)} y_l^c$, since by keeping such content, more redundant traffic may be eliminated as compared to the content which has less incoming traffic. Therefore, in the above iterative algorithm and when the current lower bound solution solved from the sub-problem (C1.1), (C1.2), and (C1.3) does not satisfy the constraint (B1.1), then the content with less value of $\Sigma_{l\in out(k)} y_l^c$ may be evicted until the constraint (B1.1) is satisfied. Based on the current value of caching variables, the sub-problem in (C1.1), (C1.2), and (C1.3) may be solved for $y_l^c$ with current $\alpha_l$ by treating $z_k^c$ as a set of given parameters, thereby yielding a caching-feasible solution. Further, the corresponding object value may be used as an upper bound if it is smaller than the current upper bound. This currently-best upper bound may then be used to update the step size (C1.7) to solve the original problem.

The preceding TE formulations may be expressed algorithms. One such algorithm, expressing an upper bound algorithm, may be set forth as follows:

```
1: Initialize the Lagrangian multipliers α_l and β_k with 0.
2: Set lower bound v = -∞ and upper bound u = ∞.
3: repeat
4:    Solve (C1.1), (C1.2), and (C1.3) for content c
5:    Set v = max{v, Σ_c L^c(α_l(τ), β_k(τ))}
6:    Find a feasible solution using the potential function method or
      heuristic approach (supra) to obtain a value Σ_c L̂^c(α_l(τ), β_k(τ)).
7:    Set u = min{u, Σ_c L̂^c(α_l(τ), β_k(τ))}.
8:    Update α_l(τ + 1) and β_k(τ + 1) with (C1.5) and (C1.6), using the
      step size as in (C1.7)
9: until u - v < ∈ or maximal number of iterations has been reached.
10: Return the solution x_l^{t,c}, y_l^c, z_k^c as the optimal solution and u as the
    best upper bound.
```

Figure 2:
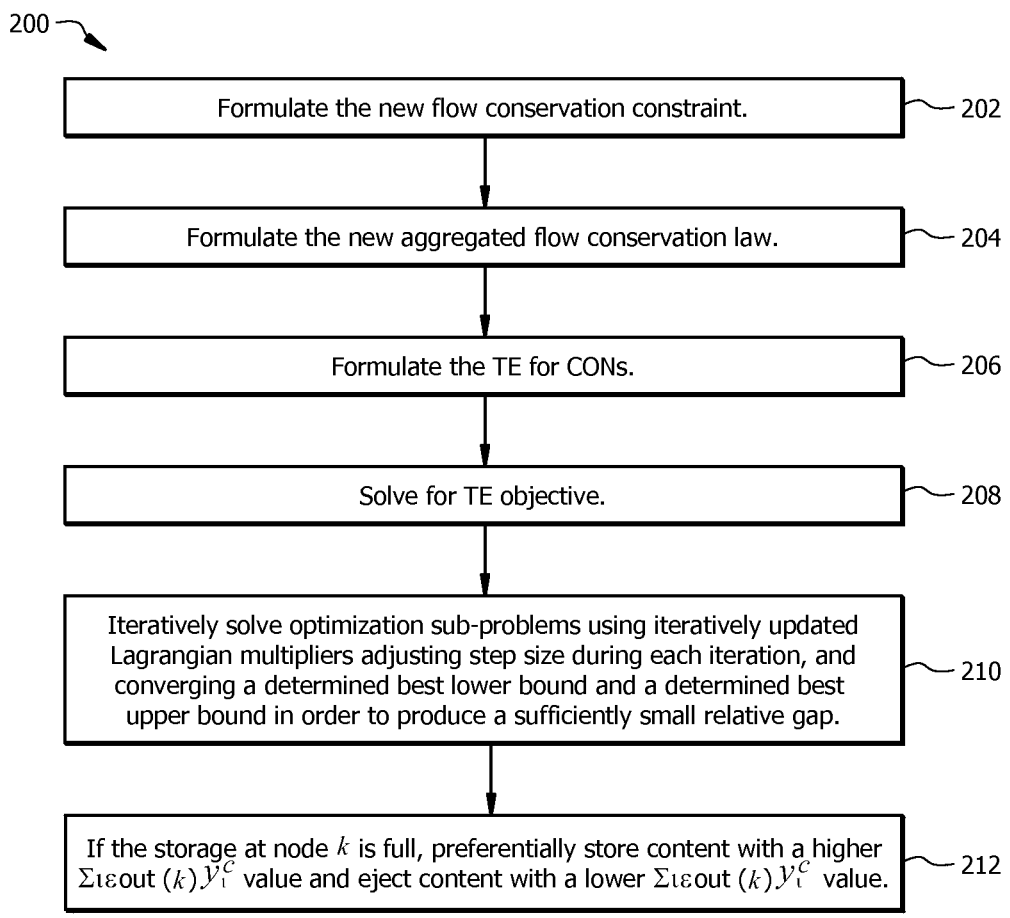
FIG. 2 is a flowchart showing one embodiment of a TE process for jointly provisioning routing and storage in CONs.

FIG. 2 is a flowchart showing one embodiment of a TE process 200 for jointly provisioning routing and storage in CONs. At 202, a new flow conservation constraint, e.g., (B1.1), may be formulated, e.g., as described above. At 204, a new aggregated flow conservation law, e.g., (B1.2), may be formulated, e.g., as described above. At 206, a TE for CONs, e.g., (B1.3)-(B1.7), may be formulated, e.g., as described above. At 208, process 200 may solve for the TE objective, e.g., MLU, BCP, BHP, and/or maximized bandwidth, e.g., as described above. At 210, process 200 may iteratively solve optimization sub-problems, e.g., (C1.1)-(C1.3), using iteratively updated Lagrangian multipliers, e.g., $\alpha_l$ and $\alpha_k$, adjusting step size, e.g., (C1.7), during each iteration, and converging a determined best lower bound, e.g., v, and a determined best upper bound, e.g., u, in order to produce a sufficiently small relative gap, e.g., gap $$\frac{u-v}{u}.$$

At 212, data may be stored on a node, e.g., node 104B of FIG. 1B. If the node storage is full, process 200 may preferentially store content with a higher $\Sigma_{l\in out(k)} y_l^c$ value and eject content with a lower $\Sigma_{l\in out(k)} y_l^c$ value.

Contrasting simulations were run over the following four PoP-level network topologies: a tier-1 ISP (ISP-A); a national educational network (ISP-B) in north America; a tier-1 ISP network in Asia (ISP-C); and a tier-1 ISP network in south America (ISP-D). The simulations utilized a discrete-event simulator to study the proposed algorithm and compare with alternative algorithms. All nodes were assumed to have both routing and storage capabilities. Each origin was assumed to connect to a random node with a 10 gigabits per second (Gbps) upstream access link. Simulation users were randomly assigned and connected to nodes through 100 megabits per second (Mbps) bidirectional access links. Each node was provided equal storage capacity equivalent to about 0.1% of the sum of all contents by default. Requests for these contents were generated for each node independently following the Zipf distribution with an exponent s=0.8 and then distributed to the clients of that node.

The simulations were run using the heuristic approach (described supra) to find a feasible upper bound in the iterative algorithm. In the step size selection, the convergence control parameter was set to two, e.g., l=2, at the beginning, then reduced by half if the lower bound did not improve in three consecutive iterations. The number of iterations was set to 100 for each implementation. The last-found upper bound solution was used as the final solution if the algorithm did not converge when 100 iterations were reached. For the smaller topologies that have less number of nodes and less number of links, e.g., ISP-A and/or ISP-B, the TE algorithm may converge within 100 iterations. For larger topologies that have more number of nodes and more number of links, e.g., ISP-C and ISP-D, the TE algorithm may not converge to the optimal solution. However, even a feasible upper bound solution which is worse than the optimal solution may be sufficient to provide a suitable solution when compared to the other alternative approaches as described herein and shown in the simulated results.

The alternative approaches to which this solution was compared include: Least Recently Used (LRU), Least Frequency Used (LFU), Least Weight Used (LWU) (wherein the least weighted sum over all in-coming links, e.g., the value $\Sigma_{l\in in(k)} w_l y_l^c$ for each content at node k, may be used to evict stored content), CDN, and CCN. Evaluated simulations in topologies with weights given assumed that the weight sum of the data flow is the TE objective, and also assumed that TE decisions are made based on historical request demand matrix. These simulations may then solve the LP problem and set up the Forwarding Table (FIB) of each node according to the solution. In one implementation, the FIB may be set up based on the optimal solution value of $y_l^c$. If $z_k^c = 1$, then requests for content c will be aggregated as in CCN; otherwise, requests will be forwarded to next-hop nodes. The network performance of the simulations may then be evaluated using different metrics, e.g.: MLU, origin load, total cost, total hops, and average of latency.

Figure 3A:
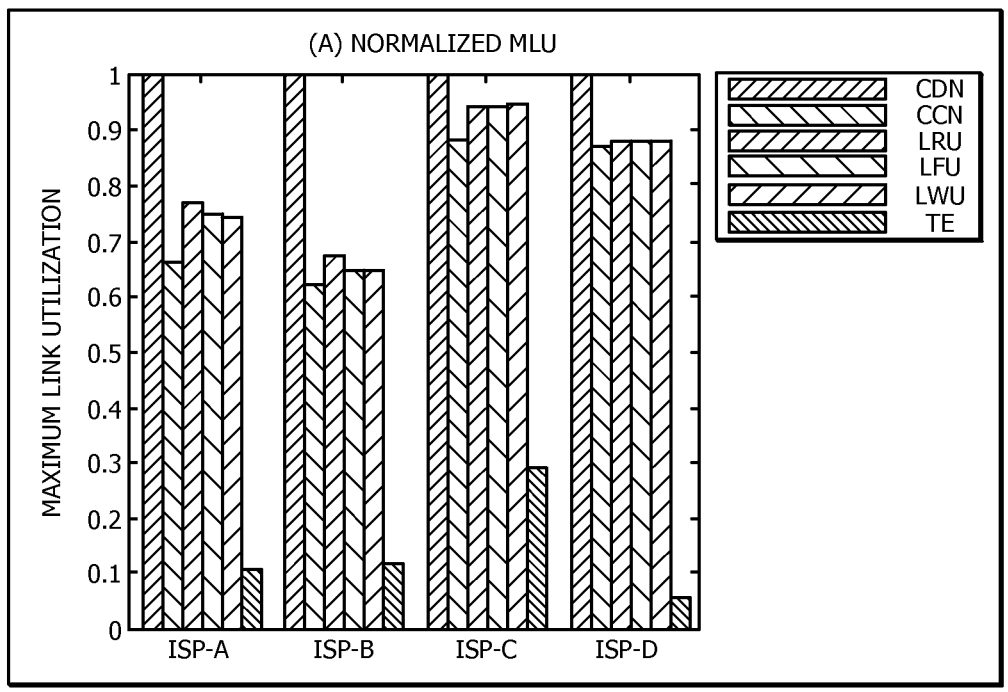
FIG. 3A is a graph plotting the normalized MLU for contrasting simulations.

FIG. 3A is a graph displaying the normalized MLU for contrasting simulations ISP-A, ISP-B, ISP-C, and ISP-D for the competing approaches shown in the legend, namely, the currently proposed TE versus LRU, LFU, LWU, CDN, and CCN approaches. FIG. 3A shows the collected total data flow over all content objects on each link for each simulation time period. In FIG. 3A, the proposed TE algorithm yielded the best performance, yielding approximately 65% (ISP-C) to approximately 90% (ISP-D) performance improvement against contrasting simulations.

Figure 3B:
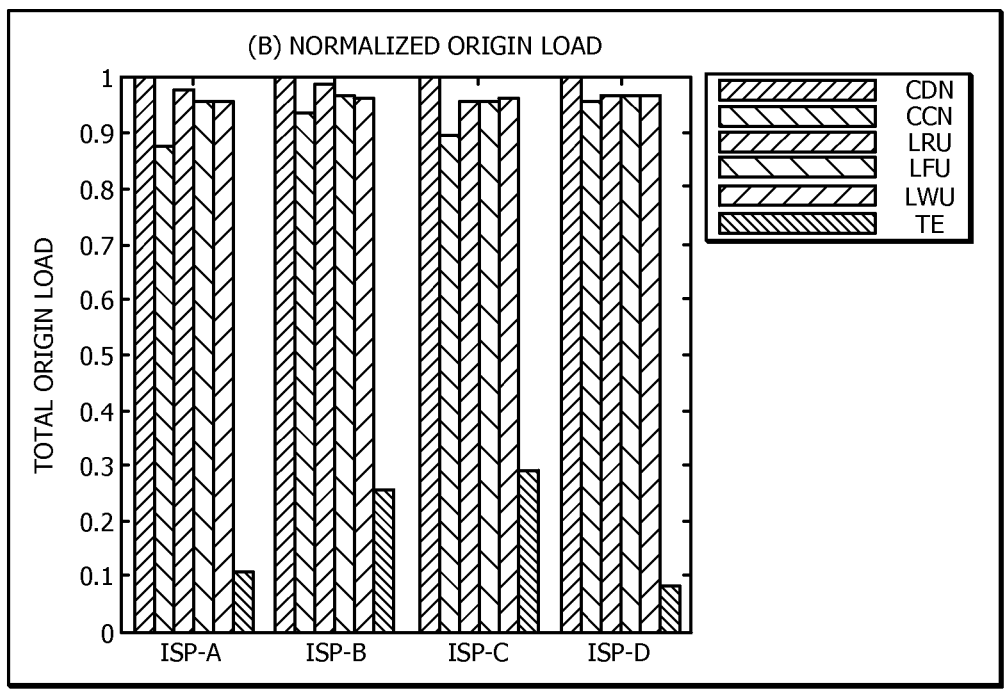
FIG. 3B is a graph displaying the normalized origin load for contrasting simulations.
Figure 4A:
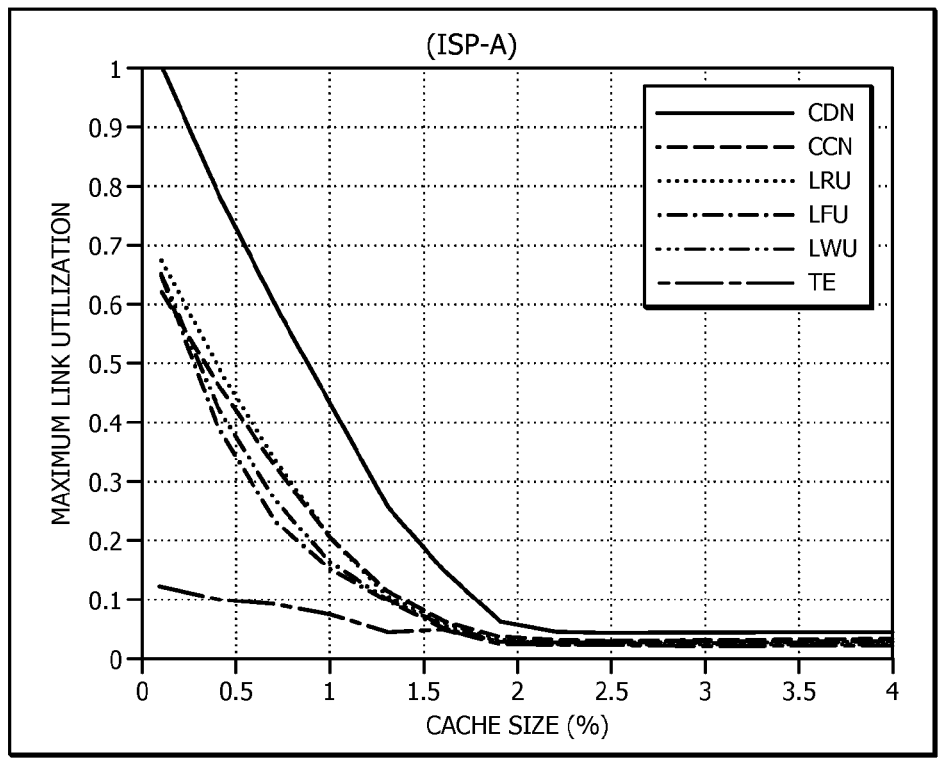
FIG. 4A is a graph plotting cache size versus the MLU for a first simulation.
Figure 4B:
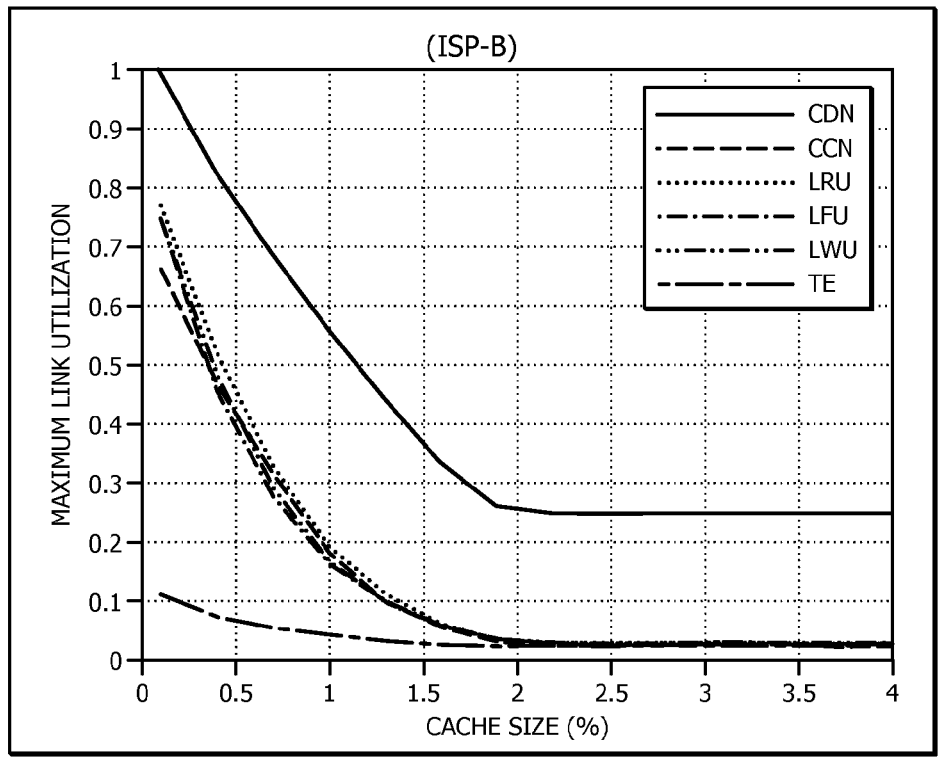
FIG. 4B is a graph plotting cache size versus the MLU for a second simulation.
Figure 4C:
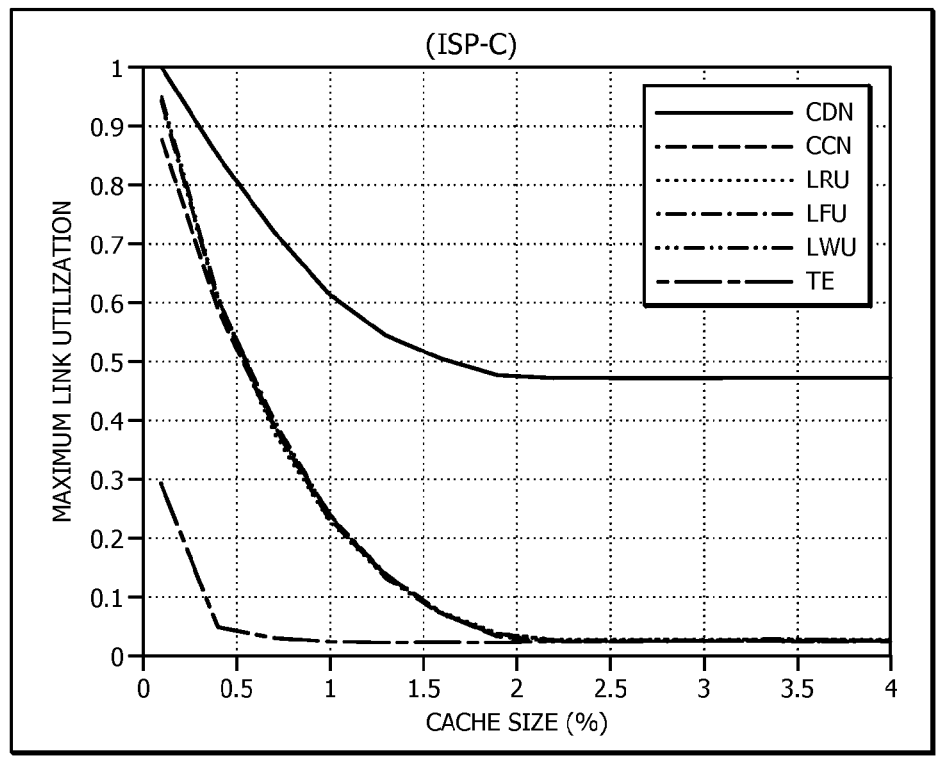
FIG. 4C is a graph plotting cache size versus the MLU for a third simulation.
Figure 4D:
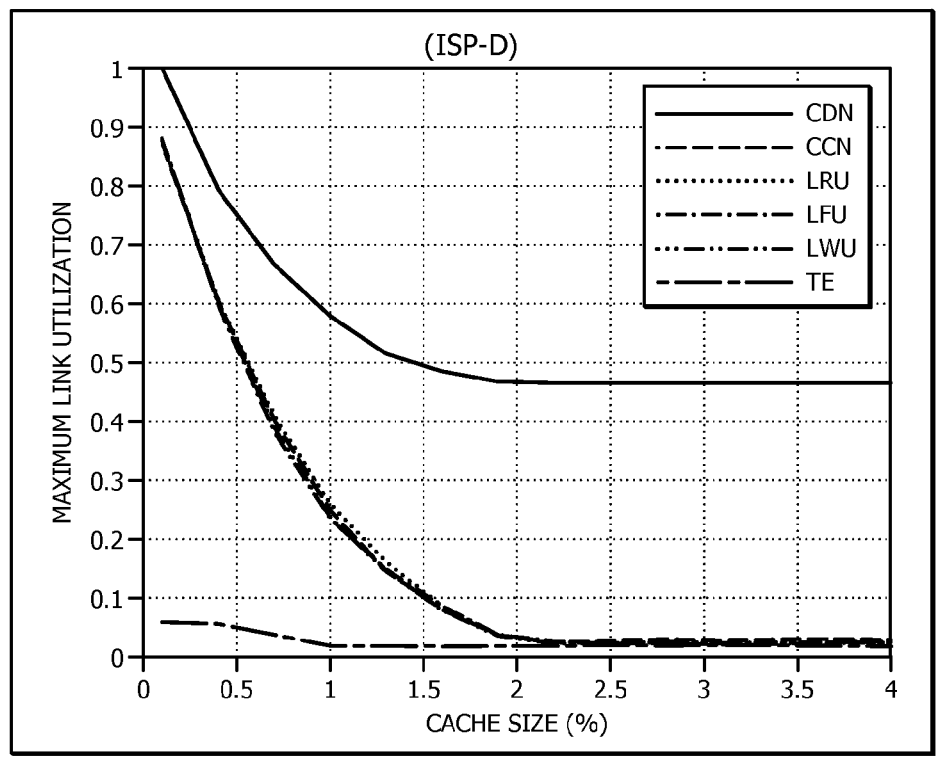
FIG. 4D is a graph plotting cache size versus the MLU for a fourth simulation.
Figure 5A:
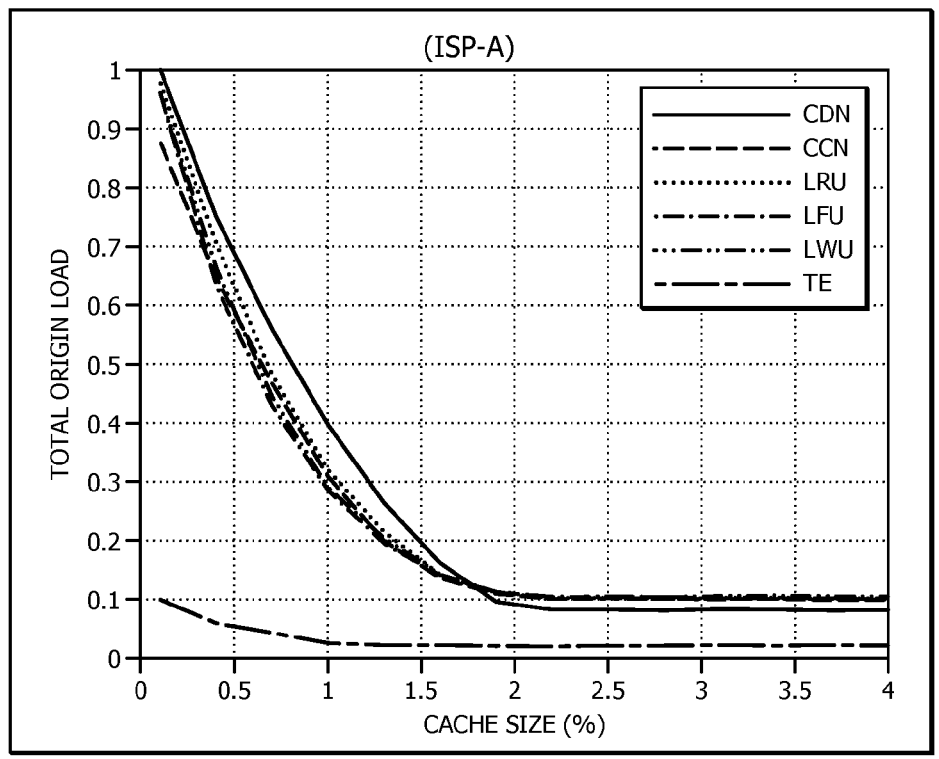
FIG. 5A is a graph plotting cache size versus total origin load for a first simulation.
Figure 5B:
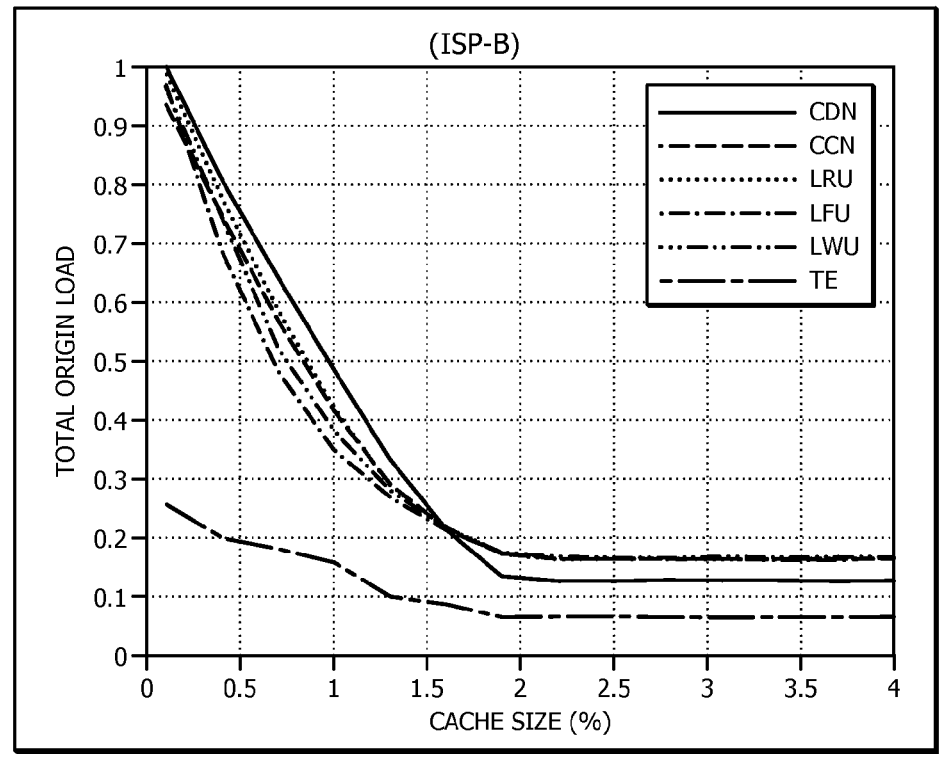
FIG. 5B is a graph plotting cache size versus total origin load for a second simulation.
Figure 5C:
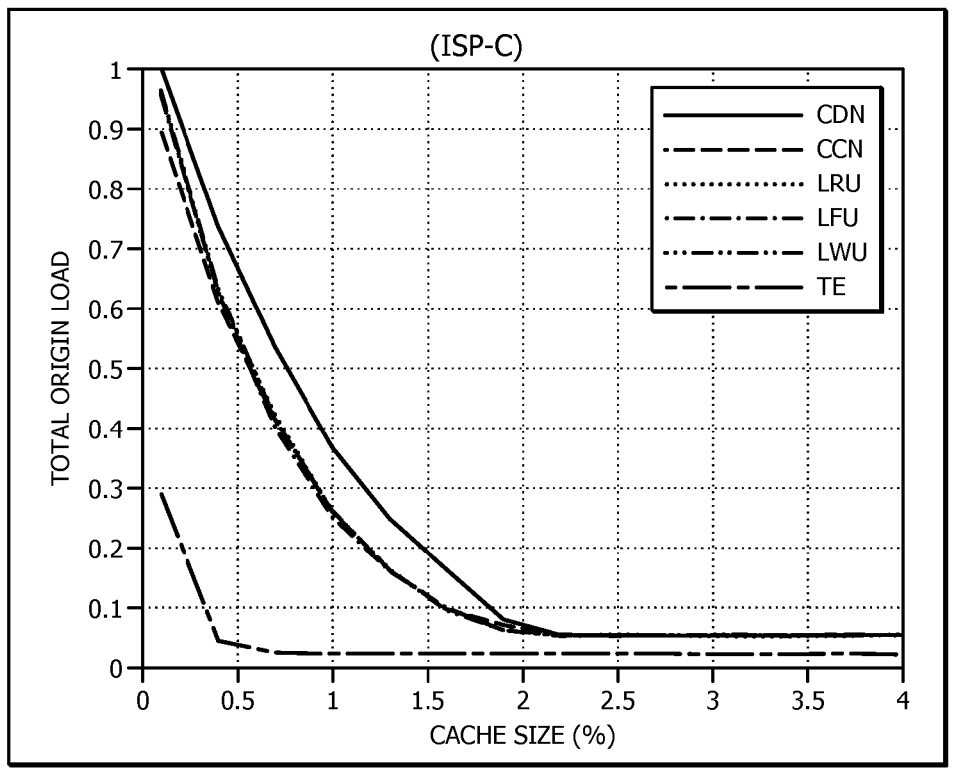
FIG. 5C is a graph plotting cache size versus total origin load for a third simulation.
Figure 5D:
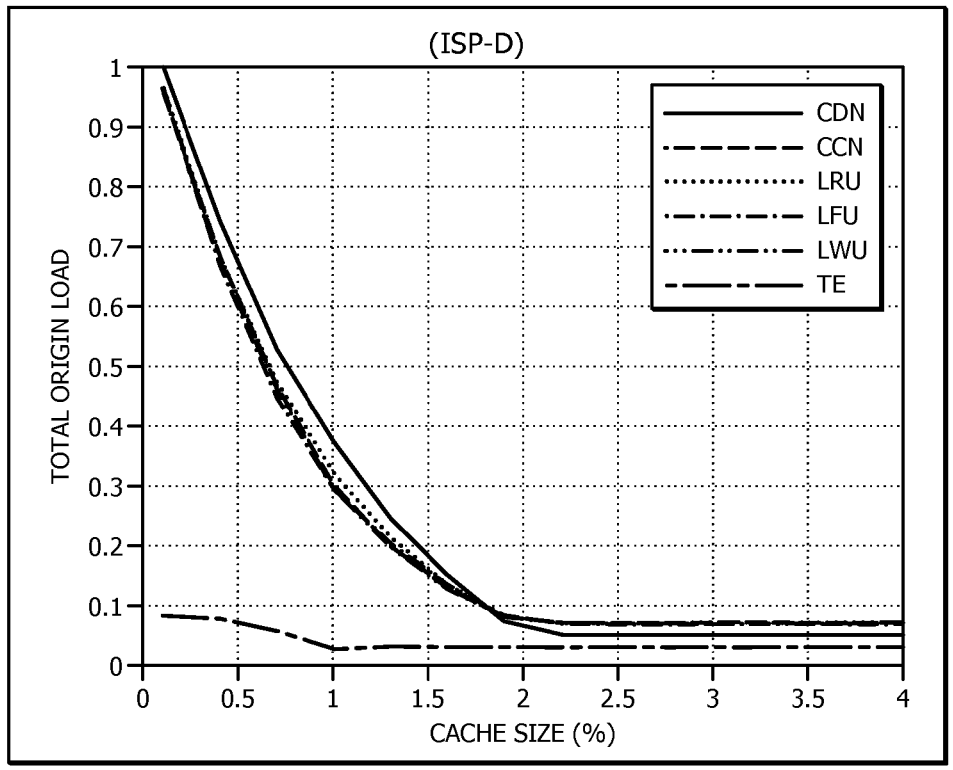
FIG. 5D is a graph plotting cache size versus total origin load for a fourth simulation.
Figure 6A:
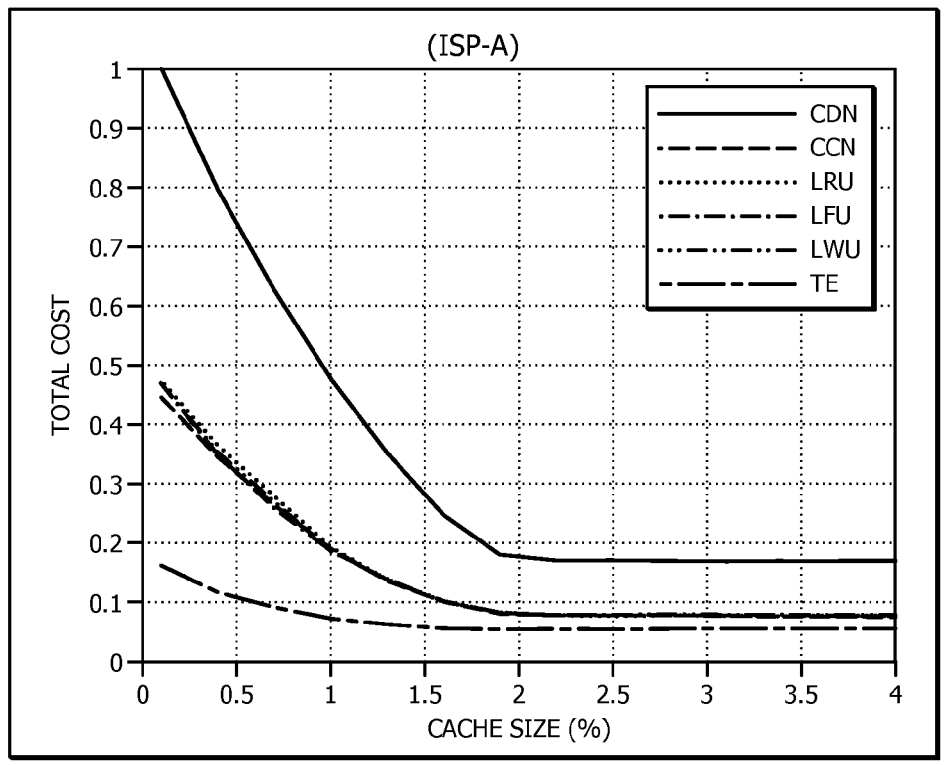
FIG. 6A is a graph plotting cache size versus total cost for a first simulation.
Figure 6B:
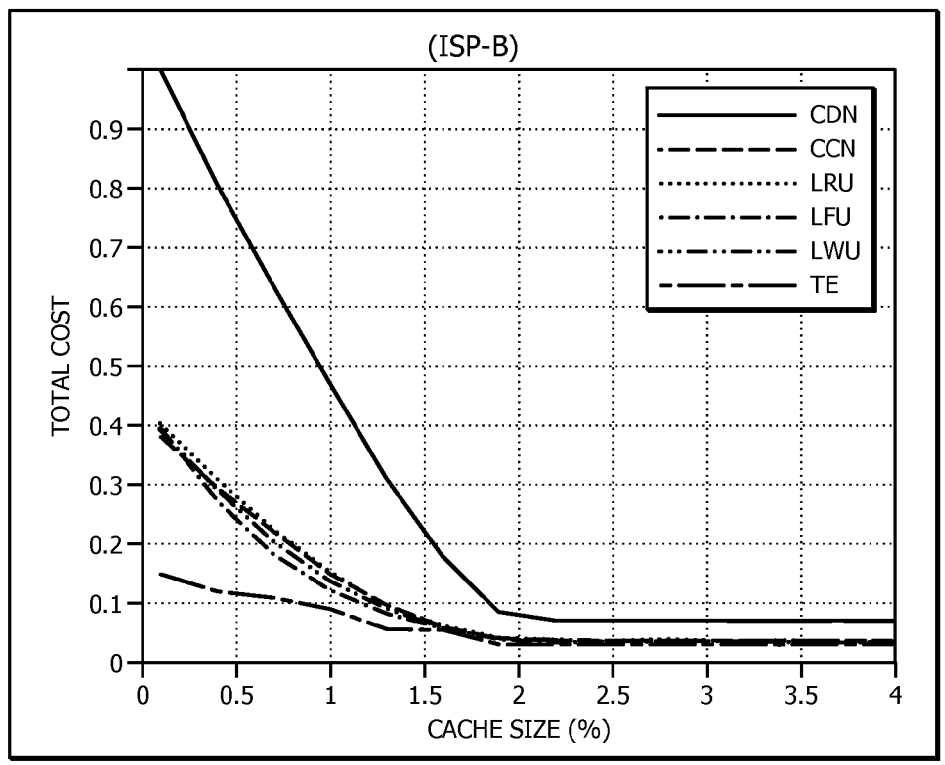
FIG. 6B is a graph plotting cache size versus total cost for a second simulation.
Figure 6C:
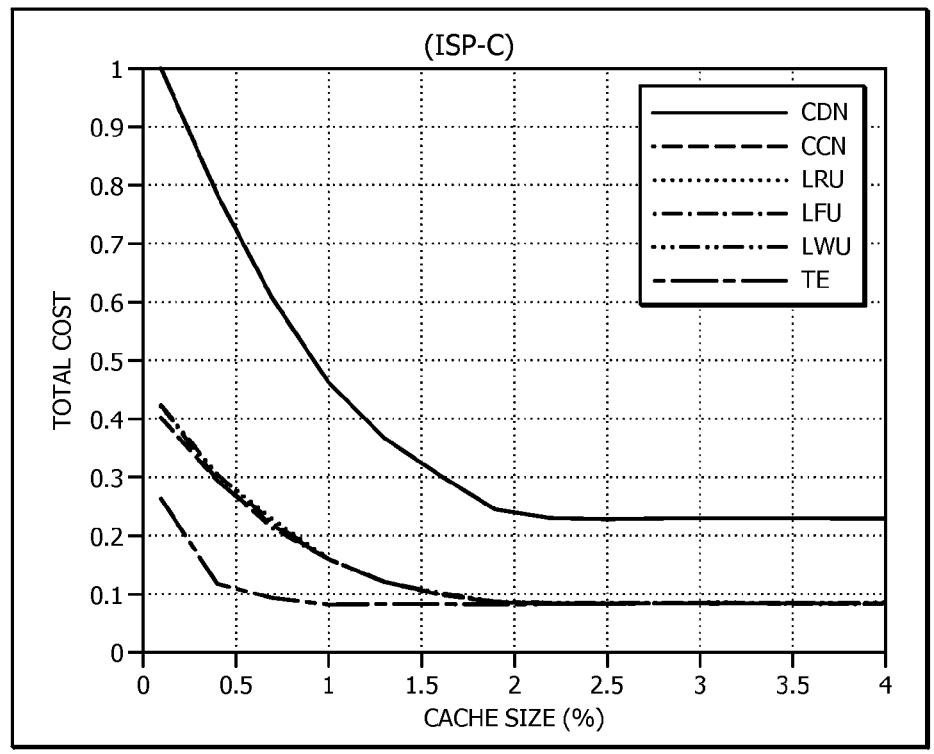
FIG. 6C is a graph plotting cache size versus total cost for a third simulation.
Figure 6D:
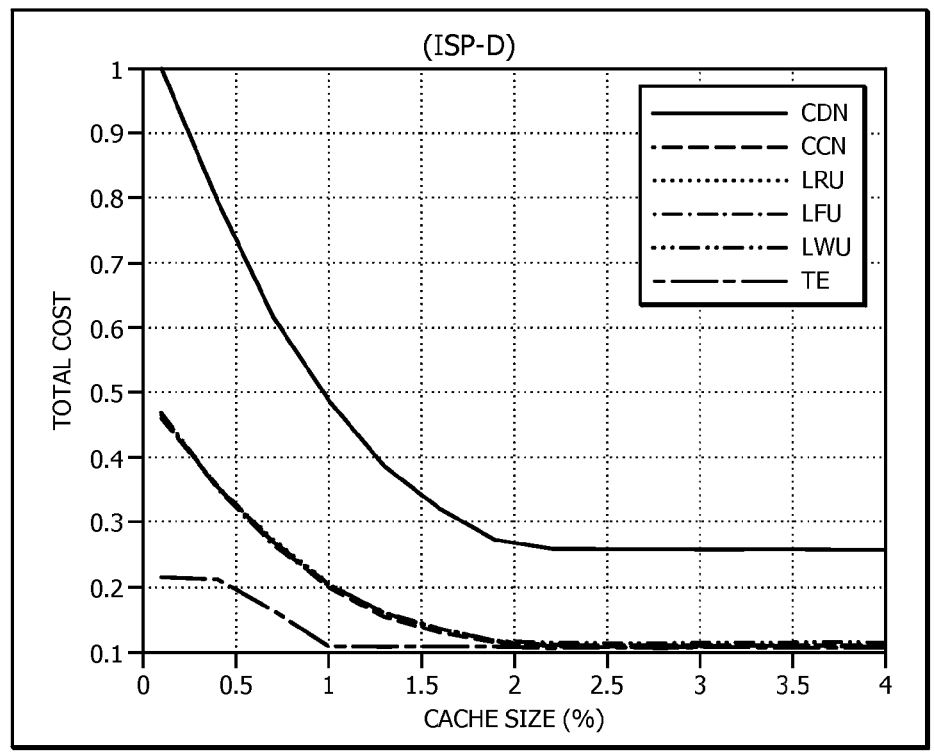
FIG. 6D is a graph plotting cache size versus total cost for a fourth simulation.
Figure 7A:
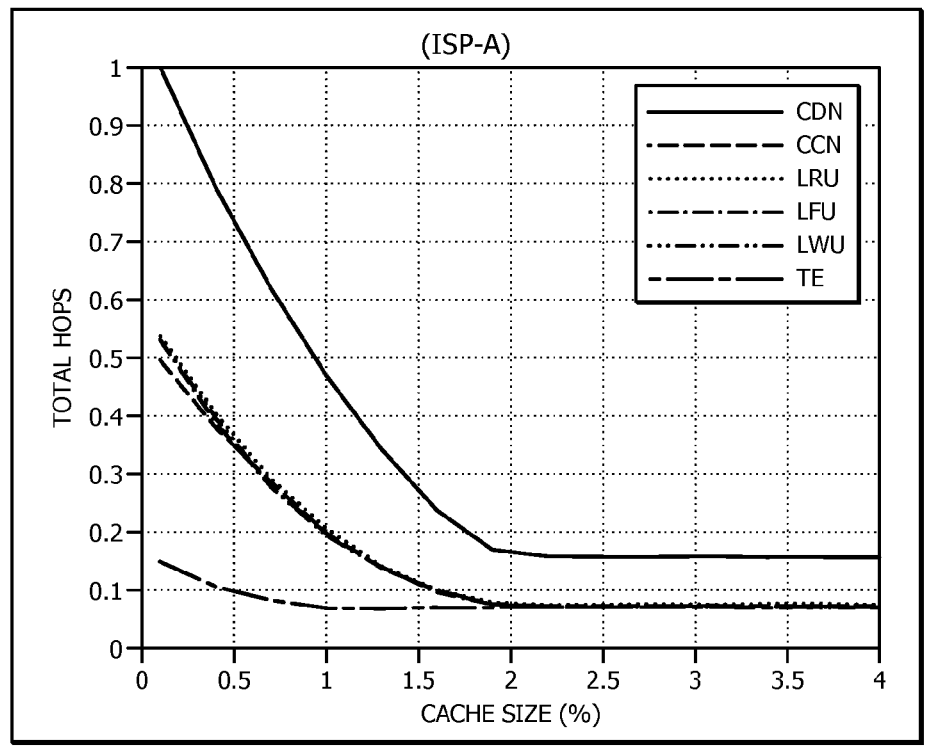
FIG. 7A is a graph plotting cache size versus total hops for a first simulation.
Figure 7B:
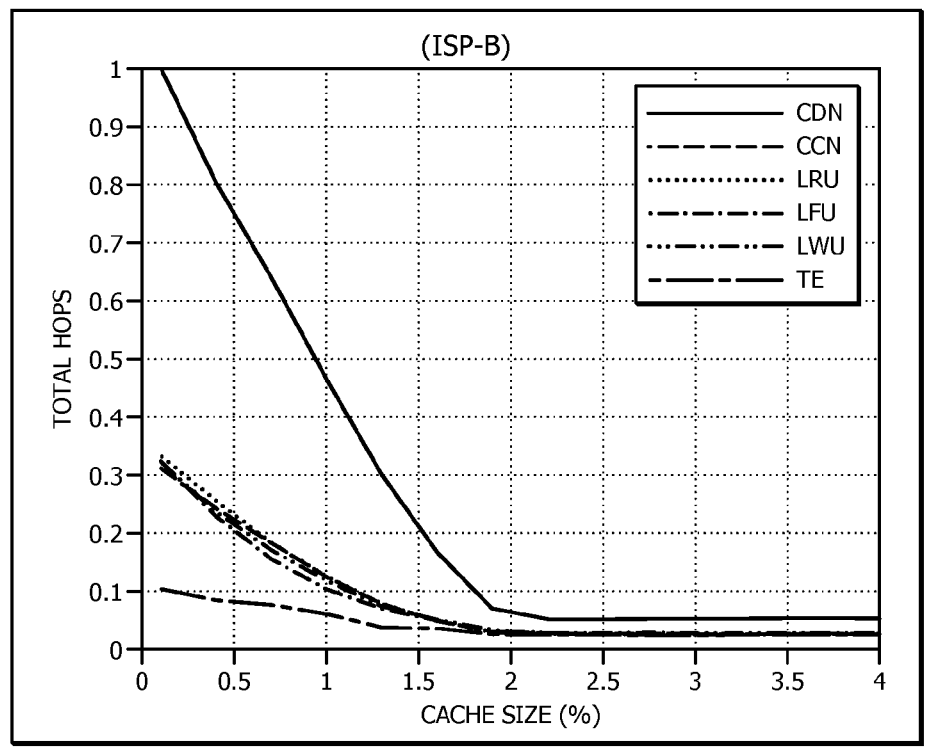
FIG. 7B is a graph plotting cache size versus total hops for a second simulation.
Figure 7C:
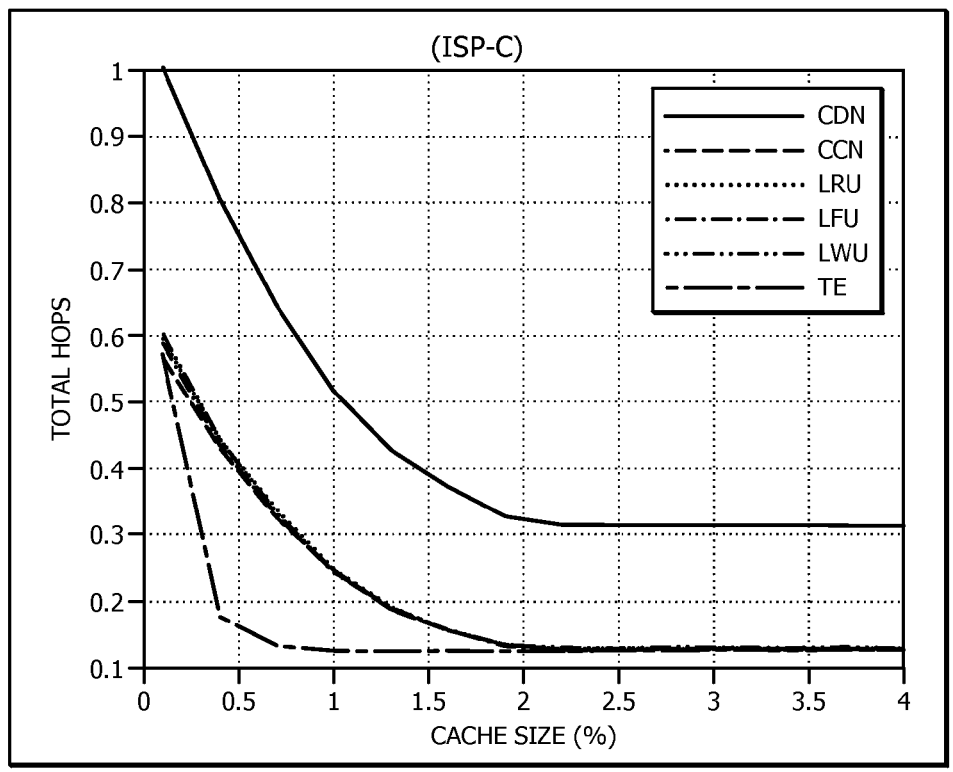
FIG. 7C is a graph plotting cache size versus total hops for a third simulation.
Figure 7D:
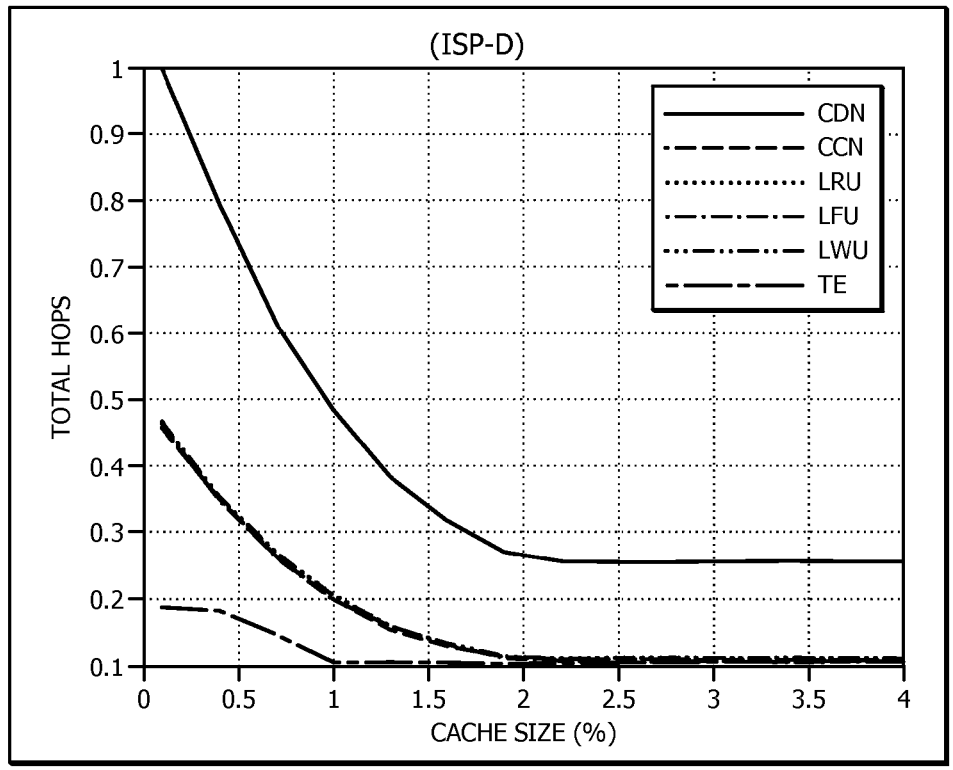
FIG. 7D is a graph plotting cache size versus total hops for a fourth simulation.
Figure 8A:
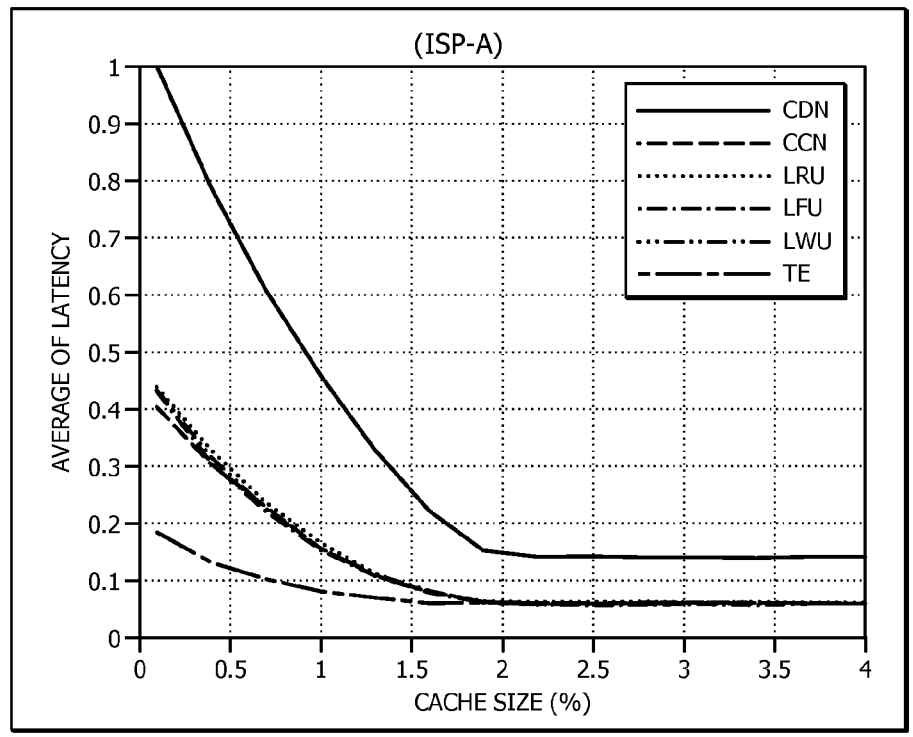
FIG. 8A is a graph plotting average latency versus total hops for a first simulation.
Figure 8B:
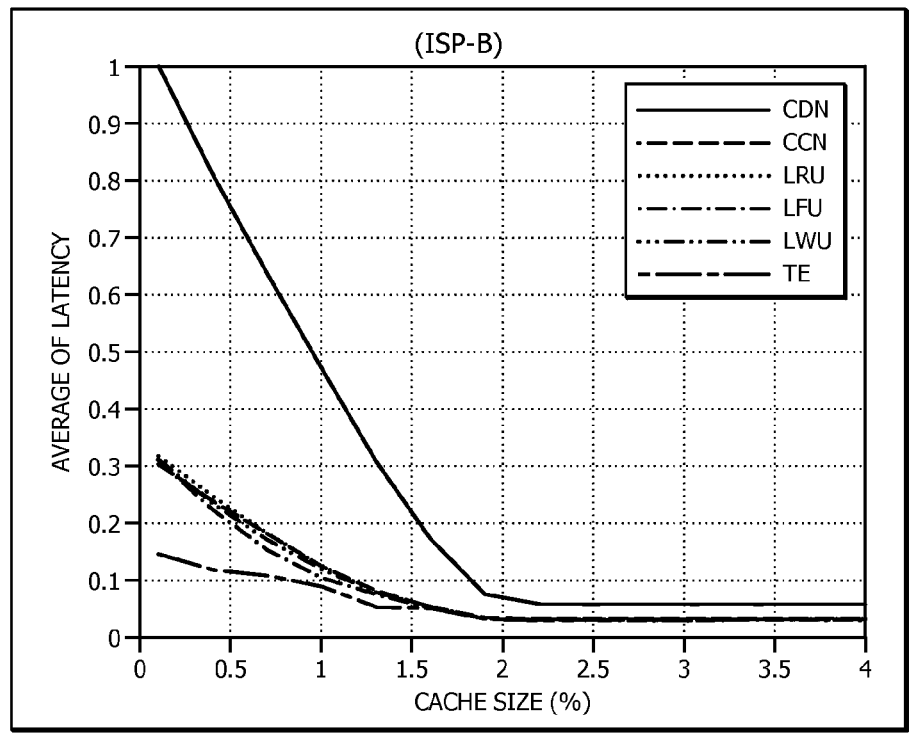
FIG. 8B is a graph plotting average latency versus total hops for a second simulation.
Figure 8C:
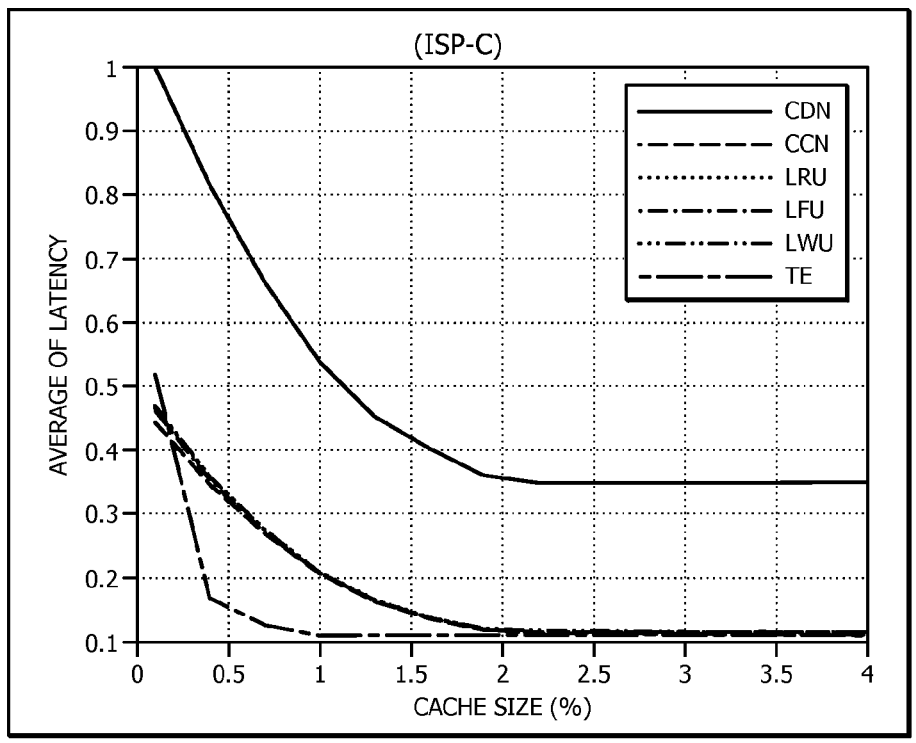
FIG. 8C is a graph plotting average latency versus total hops for a third simulation.
Figure 8D:
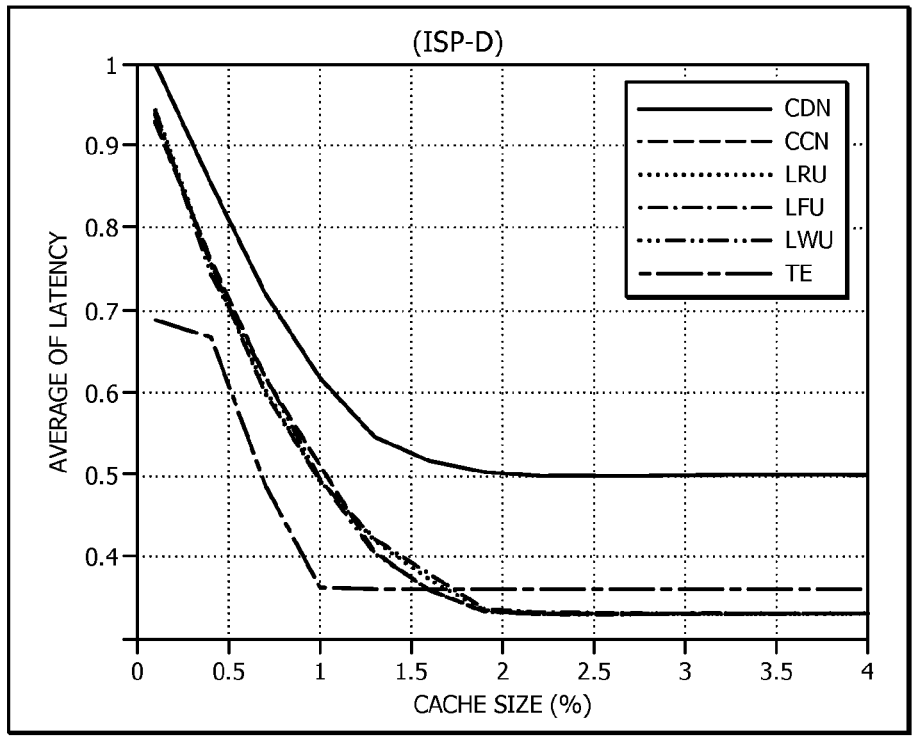
FIG. 8D is a graph plotting average latency versus total hops for a fourth simulation.

FIG. 3B is a graph displaying the normalized origin load for contrasting simulations ISP-A, ISP-B, ISP-C, and ISP-D for the competing approaches shown in the legend, namely, the currently proposed TE versus LRU, LFU, LWU, CDN, and CCN approaches. The origin load may be defined as the percentage of requests that are eventually forwarded to the origin. In FIG. 3B, the proposed TE algorithm yielded the best performance, improving the average origin load approximately 65% (ISP-B and ISP-C) to approximately 90% (ISP-A and ISP-D).

FIGS. 4A, 4B, 4C, and 4D are graphs plotting cache size versus the MLU for the different approaches shown in the legend, namely, the currently proposed TE versus LRU, LFU, LWU, CDN, and CCN approaches, on different topologies, e.g., ISP-A, ISP-B, ISP-C, and ISP-D. Comparing FIGS. 4A, 4B, 4C, and 4D shows that the proposed TE algorithm yields the best performance across the topologies, reducing MLU by approximately 65-90% compared to algorithms with smaller cache sizes, e.g., about 0.1%. As the cache size grows, all algorithms except CDN may reach approximately the same performance. FIGS. 4A, 4B, 4C, and 4D may suggest that the 2% cache size may be sufficient to reach the best performance for any given approach, however, a cache size of approximately 0.5% of cache size may be sufficient to reach the best performance for the proposed TE algorithm in any topology. This may be because, in the proposed TE algorithm with joint design in collaborative cache and traffic control, the data flow going to the same destination may be able to diverse to several paths over the whole network in order to use the cache resource efficiently, which may result in lower link utilization than other alternative designs.

FIGS. 5A, 5B, 5C, and 5D are graphs plotting cache size versus total origin load for the different approaches shown in the legend, namely, the currently proposed TE versus LRU, LFU, LWU, CDN, and CCN approaches, on different topologies, e.g., ISP-A, ISP-B, ISP-C, and ISP-D. Comparing FIGS. 5A, 5B, 5C, and 5D shows that the proposed TE algorithm yields the best performance across the topologies, improving the origin load by approximately 25% to approximately 50% for lager cache sizes, and approximately 70% to approximately 90% for smaller cache sizes. We also see that as the cache size grows, performance of the other algorithms may converge to a certain value, while the proposed TE algorithm may continue to yield better performance. This may be because the proposed TE algorithm uses the overall storage more efficiently, resulting in more local cache hits. The average load on the origin server may rapidly decrease as a result compared to other alternative algorithms, especially when the cache size is smaller.

FIGS. 6A, 6B, 6C, and 6D are graphs plotting cache size versus the total cost for the different approaches shown in the legend, namely, the currently proposed TE versus LRU, LFU, LWU, CDN, and CCN approaches, on different topologies, e.g., ISP-A, ISP-B, ISP-C, and ISP-D. Comparing FIGS. 6A, 6B, 6C, and 6D shows that the proposed TE algorithm yields the best performance across the topologies, improving costs by approximately 32% to approximately 62% for cache sizes less than about 2%. This may be because the alternative algorithms follow the shortest paths to fetch the content from origin. This may cause the requests to congest in the same storage path. Consequently, as congestion rises, an increasing amount of traffic cannot get served locally by node caching, which results in higher cost.

FIGS. 7A, 7B, 7C, and 7D are graphs plotting the cache size versus the total hops for the different approaches shown in the legend, namely, the currently proposed TE versus LRU, LFU, LWU, CDN, and CCN approaches, on different topologies, e.g., ISP-A, ISP-B, ISP-C, and ISP-D. Comparing FIGS. 7A, 7B, 7C, and 7D shows that the proposed TE algorithm yields the best performance across the topologies, with one exception against LRU on topology ISP-C at approximately 0.1% of cache size. This exception may be because the proposed TE algorithm may not yet have converged in the given 100 iterations. However, even in this worst-case solution, the TE algorithm consistently outperforms the other evaluated approaches and outperforms LRU across the range of cache sizes following the initial data point. This suggests that, upon consideration, the proposed TE algorithm yields the best overall performance with respect to total hops.

FIGS. 8A, 8B, 8C, and 8D are graphs plotting the average latency versus the total hops for the different approaches shown in the legend, namely, the currently proposed TE versus LRU, LFU, LWU, CDN, and CCN approaches, on different topologies, e.g., ISP-A, ISP-B, ISP-C, and ISP-D. Comparing FIGS. 8A, 8B, 8C, and 8D shows that the proposed TE algorithm yields the best performance across the topologies for lower percentage cache sizes, yielding approximately 20% to approximately 50% improvement, even when the primary target is to optimize the weight sum of data flow, provided all weights are known in the data set of the contrasting topologies. As cache size grows, the proposed TE algorithm may yield a generally similar performance as the contrasting approaches. In view of the above, FIGS. 8A, 8B, 8C, and 8D may suggest that on each link, as along as the weight does not decrease as the latency increases, the proposed TE algorithm may still archive a better performance in average of latency, even where the weight sum is the target of optimization.

Figure 9:
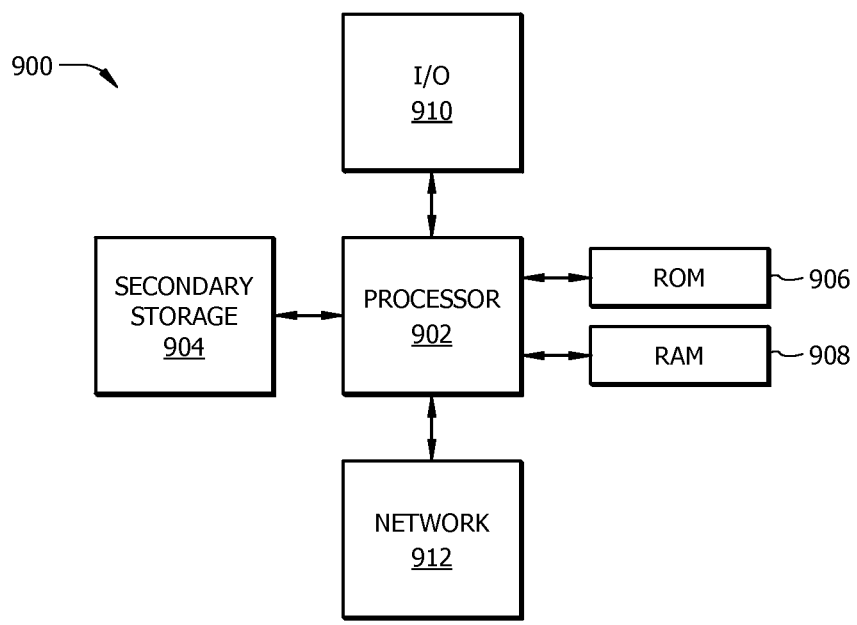
FIG. 9 is a schematic diagram of a typical, general-purpose network component.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read-only memory (ROM) 906, random-access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or erasable programmable ROM (EPROM) and is used for non-volatile storage of data. Secondary storage 904 may be used to store programs that are loaded into RAM 908 when such programs are selected for execution. The ROM 906 is used to store instructions and perhaps data that are read during program execution. The ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

It is understood that by programming and/or loading executable instructions onto the general computing device 900, at least one of the processor 902, the ROM 906, and the RAM 908 are changed, transforming the general computing device 900 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a transceiver configured to receive and transmit data packets in a content oriented network (CON), wherein the CON includes a plurality of resources comprising a plurality of nodes coupled by a plurality of links, and wherein the nodes comprise a storage capability;
a processor coupled to the transceiver and configured to:
determine a Traffic Engineering (FE) model for the CON including a TE objective and a set of constraints based on aggregated data flows of a content over the links, an aggregated data flow of a link to represent merged data flows of the content over the links towards multiple destination nodes in the CON,
wherein the TE objective characterizes a utilization of the resources in the CON including storage usage indicators associated with the nodes, each storage usage indicator indicating a percentage of the content received at a node to be stored at the node,
wherein the set of constraints include an aggregated flow conservation constraint, a bandwidth constraint, and a storage constraint, wherein the aggregated flow conservation constraint represents a relationship between a total incoming aggregated data flows and a total outgoing aggregated data flows of the content for each node,
wherein the bandwidth constraint indicates a bandwidth limit for each link, wherein the storage constraint indicates a storage capacity limit for each node,
wherein the bandwidth constraint d the storage constraint cause a routed data flow of the content within the CON to be bounded by an aggregated data flow of the content within the CON,
wherein the routed data flow of the content represents transmission of the content through the CON;
determine a set of values for the aggregated data flows and the storage usage indicators to satisfy the set of constraints;
apply the set of values to the TE model;
determine a TE scheme for the CON according to the TE model including the set of values;
employ the TE scheme to provision memory resources in a memory coupled to the processor based on the TE scheme;
store each data packet in the memory based on the provisioned memory resources;
determine a destination for at least one data packet based on the TE scheme; and
cause the transceiver to transmit at least one data packet to the destination.

2. The apparatus of claim 1, wherein the TE objective is selected from a group consisting of: bandwidth usage, maximum link utilization (MLU), Bit Cost Product (BCP), and Bit Hop-count Product (BHP).

3. The apparatus of claim 1, wherein the storage usage indicator is a fractional value.

4. The apparatus of claim 1, wherein routing and in-network storage within the CON are deployed in a same network layer.

5. The apparatus of claim 1, wherein routing and in-network storage within the CON are deployed in different network layers.

6. The apparatus of claim 1, wherein the TE model decouples routing provisioning in the CON from coordinated storage provisioning in the CON.

7. The apparatus of claim 1, wherein the CON is managed by a single administrative domain.

8. The apparatus of claim 1, wherein the TE scheme for the CON is further determined through decomposition of the TE model including the set of values.

9. The apparatus of claim 1, wherein the aggregated data flow of the content within the CON is a sum of all flows heading to all destinations within the CON when the storage usage indicator has a value of zero.

10. The apparatus of claim 1, wherein a Forwarding Table (FIB) is provisioned in the memory based on the TE scheme.

11. A method executable by a processor in a network node, comprising:

receiving, via a transceiver configured to receive and transmit data packets in a content oriented network (CON), a data packet, wherein the CON includes a plurality of resources comprising a plurality of nodes coupled by a plurality of links, and wherein the nodes comprise a storage capability;

determining a Traffic Engineering (TE) model for the CON including a TE objective and a set of constraints based on aggregated data flows of a content over the links, an aggregated data flow of a link to represent merged data flows of the content over the links towards multiple destination nodes in the CON, wherein the TE objective characterizes a utilization of the resources in the CON including storage usage indicators associated with the nodes, each storage usage indicator indicating a percentage of the content received at a node to be stored at the node, wherein the set of constraints include an aggregated flow conservation constraint, a bandwidth constraint, and a storage constraint, wherein the aggregated flow conservation constraint represents a relationship between a total incoming aggregated data flows and a total outgoing aggregated data flows of the content for each node, wherein the bandwidth constraint indicates a bandwidth limit for each link, wherein the storage constraint indicates a storage capacity limit for each node, wherein the bandwidth constraint and the storage constraint cause a routed data flow of the content within the CON to be bounded by an aggregated data flow of the content within the CON, wherein the routed data flow of the content represents transmission of the content through the CON;

determining a set of values for the aggregated data flows and the storage usage indicators to satisfy the set of constraints;

applying the set of values to the TE model;

determining a TE scheme for the CON according to the TE model including the set of values;

employing the TE scheme to provision memory resources in a memory coupled to the processor based on the TE scheme;

storing the data packet in the memory based on the provisioned memory resources;

determining a destination for the data packet based on the TE scheme; and causing the transceiver to transmit the data packet to the destination.

12. The method of claim 11, wherein the TE objective is selected from a group consisting of: bandwidth usage, maximum link utilization (MLU), Bit Cost Product (BCP), and Bit Hop-count Product (BHP).

13. The method of claim 11, wherein the storage indicator is a fractional value.

14. The method of claim 11, wherein routing and in-network storage within the CON are deployed in a same network layer.

15. The method of claim 11, wherein routing and in-network storage within the CON are deployed in different network layers.

16. The method of claim 11, wherein the TE model decouples routing provisioning in the CON from coordinated storage provisioning in the CON.

17. The method of claim 11, wherein the CON is managed by a single administrative domain.

18. The method of claim 11, wherein the TE scheme for the CON is further determined through decomposition of the TE model including the set of values.

19. The method of claim 11, wherein the aggregated data flow of the content within the CON is a sum of all flows heading to all destinations within the CON when the storage usage indicator has a value of zero.

20. The method of claim 11, wherein a Forwarding Table (FIB) is provisioned in the memory based on the TE scheme.

* * * * *